United States Patent
Ikai et al.

(10) Patent No.: US 11,889,070 B2
(45) Date of Patent: Jan. 30, 2024

(54) IMAGE FILTERING APPARATUS, IMAGE DECODING APPARATUS, AND IMAGE CODING APPARATUS

(71) Applicant: SHARP KABUSHIKI KAISHA, Sakai (JP)

(72) Inventors: Tomohiro Ikai, Sakai (JP); Norio Itoh, Sakai (JP); Takeshi Chujoh, Sakai (JP); Yasuaki Tokumo, Sakai (JP); Hiroshi Watanabe, Tokyo (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 204 days.

(21) Appl. No.: 17/040,404

(22) PCT Filed: Mar. 25, 2019

(86) PCT No.: PCT/JP2019/012589
§ 371 (c)(1),
(2) Date: Sep. 22, 2020

(87) PCT Pub. No.: WO2019/182159
PCT Pub. Date: Sep. 26, 2019

(65) Prior Publication Data
US 2021/0021820 A1    Jan. 21, 2021

(30) Foreign Application Priority Data
Mar. 23, 2018 (JP) .................... 2018-057181

(51) Int. Cl.
*H04N 19/117* (2014.01)
*H04N 19/124* (2014.01)
(Continued)

(52) U.S. Cl.
CPC ............. *H04N 19/117* (2014.11); *G06N 3/08* (2013.01); *H04N 19/124* (2014.11); *H04N 19/159* (2014.11); *H04N 19/82* (2014.11)

(58) Field of Classification Search
CPC .. H04N 19/117; H04N 19/124; H04N 19/159; H04N 19/82; G06N 3/08; G06N 3/0454; G06N 3/063
See application file for complete search history.

(56) References Cited

U.S. PATENT DOCUMENTS

| 10,448,009 | B1 * | 10/2019 | Khsib .................. H04N 19/149 |
| 2012/0230423 | A1 | 9/2012 | Esenlik et al. |

(Continued)

FOREIGN PATENT DOCUMENTS

| JP | 2014-512732 A | 5/2014 |
| WO | 2011/152425 A1 | 12/2011 |
| WO | 2013/047325 A1 | 4/2013 |

OTHER PUBLICATIONS

Jianle Chen et al., "Algorithm Description of Joint Exploration Test Model 6 (JEM 6)", JVET-F1001-v3, Joint Video Exploration Team(JVET) of ITU-T SG 16 WP3 and ISO/IEC JTC 1/SC 29/WG 11, 6th Meeting: Hobart, AU, Mar. 31-Apr. 7, 2017.

(Continued)

*Primary Examiner* — Joseph W Becker
(74) *Attorney, Agent, or Firm* — ScienBiziP, P.C.

(57) ABSTRACT

A filtered image with enhanced image quality is output. Provided is a loop filter including: a filtering processing unit configured to apply a filter to an unfiltered image; and an ALF unit configured to receive input of a DL image to which a filter is applied by a first filtering processing unit out of the filtering processing unit. The ALF unit further receives input of the unfiltered image.

5 Claims, 27 Drawing Sheets

(51) Int. Cl.
  *H04N 19/82* (2014.01)
  *H04N 19/159* (2014.01)
  *G06N 3/08* (2023.01)

(56) References Cited

U.S. PATENT DOCUMENTS

| | | |
|---|---|---|
| 2013/0077884 A1 | 3/2013 | Ikai et al. |
| 2018/0211157 A1* | 7/2018 | Liu .................... G06V 10/7715 |
| 2018/0249158 A1* | 8/2018 | Huang .................... H04N 19/46 |
| 2020/0120340 A1* | 4/2020 | Park ........................ G06T 9/002 |

OTHER PUBLICATIONS

Yuanying Dai et al., "A Convolutional Neural Network Approach for Post-Processing in HEVC Intra Coding", MMM2017.
Lulu Zhou et al., "Convolutional Neural Network Filter (CNNF) for intra frame", JVET-I0022, Joint Video Exploration Team (JVET) of ITU-T SG 16 WP 3 and ISO/IEC JTC 1/SC 29/WG 11, Jan. 20-26, 2018.

* cited by examiner

IMAGE FILTERING APPARATUS, IMAGE DECODING APPARATUS, AND IMAGE CODING APPARATUS

TECHNICAL FIELD

One aspect of the disclosure relates to an image filtering apparatus, an image decoding apparatus, and an image coding apparatus.

BACKGROUND ART

A video coding apparatus which generates coded data by coding a video, and a video decoding apparatus which generates decoded images by decoding the coded data are used for efficient transmission or recording of videos.

For example, specific video coding schemes include schemes proposed in H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, units of coding (Coding Units; which will be referred to as CUs) obtained by splitting a coding tree unit, prediction units (PUs) which are blocks obtained by splitting a coding unit, and transform units (TUs), and are coded/decoded for each CU.

In such a video coding scheme, usually, a prediction image is generated based on a local decoded image that is obtained by coding/decoding an input image (a source image), and prediction residual components (which may be referred to also as "difference images" or "residual images") obtained by subtracting the prediction image from the input image are coded. Generation methods of prediction images include an inter-picture prediction (an inter prediction) and an intra-picture prediction (intra prediction).

One example of the technology of video coding and decoding of recent years is NPL 1. NPL 1 discloses a technology of an Adaptive Loop Filter (ALF) in particular.

Other examples of the technology of using a neural network for a coding image are NPL 2 and NPL 3. In NPL 2, a filter referred to as a Variable-filter-size Residue-learning CNN (VRCNN) is used.

CITATION LIST

Non Patent Literature

NPL 1: "Algorithm Description of Joint Exploration Test Model 6", JVET-F1001, Joint Video Exploration Team (JVET) of ITU-T SG 16 WP 3 and ISO/IEC JTC 1/SC 29/WG 11, 31 March-7 April 2017

NPL 2: "A Convolutional Neural Network Approach for Post-Processing in HEVC Intra Coding", MMM 2017

NPL 3: Convolutional Neural Network Filter (CNNF) for intra frame JVET-I0022, Joint Video Exploration Team (JVET) of ITU-T SG 16 WP 3 and ISO/IEC JTC 1/SC 29/WG 11, 20-26 January 2018

SUMMARY

Technical Problem

However, although the ALF is capable of adaptive processing according to a filter input image, the ALF is not adequate to enhance image quality because the ALF is limited to linear processing. In contrast, owing to non-linear processing of a multi-stage configuration, a filter using a neural network shows remarkable enhancement in image quality depending on an input image. However, because results depend on previously learned data, some input images may have deteriorated image quality, depending on a filter. Under such circumstances, from the point of view of enhancement of image quality, improvement of filters has been required.

In the light of this, the disclosure is made in view of the problems described above, and has an object to provide a technology of outputting a filtered image with enhanced image quality.

Solution to Problem

To solve the problems described above, an image filtering apparatus according to the disclosure is an image filtering apparatus for performing operation on an input image, the image filtering apparatus including: one or multiple filtering processing units each being configured to include a neural network for applying a filter to the input image; and an ALF unit configured to receive input of an image to which a filter is applied by a first filtering processing unit out of the one or multiple filtering processing units, wherein the ALF unit further receives input of at least any one of the input image and an image to which a filter is applied by a second filtering processing unit different from the first filtering processing unit out of the one or multiple filtering processing units.

To solve the problems described above, an image filtering apparatus according to the disclosure includes: a filter unit configured to perform operation on an input image while switching filter coefficients on a prescribed unit basis with reference to class information; and a class selection unit configured to generate the class information, wherein the class selection unit includes a neural network that receives input of the input image and a quantization parameter related to the input image and outputs the class information.

To solve the problems described above, an image filtering apparatus according to the disclosure includes: a filter unit configured to perform operation on an input image; and a filter coefficient generation unit configured to generate a filter coefficient to be directly or indirectly used by the filter unit, wherein the filter coefficient generation unit includes a neural network for outputting the filter coefficient.

Advantageous Effects of Disclosure

According to one aspect of the disclosure, a filtered image with enhanced image quality can be output.

DESCRIPTION OF EMBODIMENTS

First Embodiment

Hereinafter, embodiments of the disclosure will be described with reference to the drawings.

Figure 27:
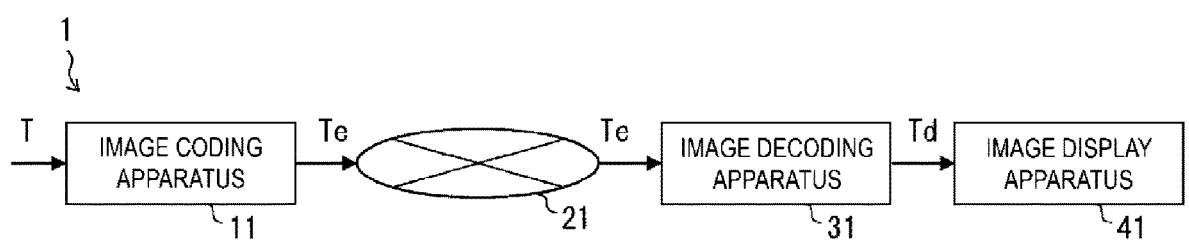
FIG. 27 is a schematic diagram illustrating a configuration of an image transmission system according to the present embodiment.

FIG. 27 is a schematic diagram illustrating a configuration of an image transmission system 1 according to the present embodiment.

The image transmission system 1 is a system in which codes of a coding target image are transmitted, the transmitted codes are decoded, and thus an image is displayed. The image transmission system 1 includes an image coding apparatus 11, a network 21, an image decoding apparatus 31, and an image display apparatus 41.

An image T indicating an image of a single layer or multiple layers is input to the image coding apparatus 11. A layer is a concept used to distinguish multiple pictures in a case that there are one or more pictures constituting a certain time. For example, coding identical pictures in multiple layers having different image qualities and resolutions is scalable coding, and coding pictures having different viewpoints in multiple layers is view scalable coding. In a case that a prediction (an inter-layer prediction, an inter-view prediction) between pictures in multiple layers is performed, coding efficiency greatly improves. In addition, in a case that a prediction is not performed (simulcast), coded data can be compiled.

The network 21 transmits a coding stream Te generated by the image coding apparatus 11 to the image decoding apparatus 31. The network 21 is the internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coding stream Te is recorded, such as a Digital Versatile Disc (DVD) or a Blue-ray Disc (BD).

The image decoding apparatus 31 decodes each of the coding streams Te transmitted from the network 21 and generates one or each of multiple decoded images Td.

The image display apparatus 41 displays all or part of the one or multiple decoded images Td generated by the image decoding apparatus 31. For example, the image display apparatus 41 includes a display device such as a liquid crystal display and an organic Electro-luminescence (EL) display. In addition, in spatial scalable coding and SNR scalable coding, in a case that the image decoding apparatus 31 and the image display apparatus 41 have a high processing capability, an enhanced layer image having high image quality is displayed, and in a case that the apparatuses have a lower processing capability, a base layer image which does not require as high a processing capability and display capability as an enhanced layer is displayed.

Operator

Operators used in the present specification will be described below.

>> is a right bit shift, << is a left bit shift, & is a bitwise AND, | is a bitwise OR, and |= is an OR assignment operator.

x?y:z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

Structure of Coding Stream Te

Prior to the detailed description of the image coding apparatus 11 and the image decoding apparatus 31 according to the present embodiment, a data structure of the coding stream Te generated by the image coding apparatus 11 and decoded by the image decoding apparatus 31 will be described.

Figure 1:
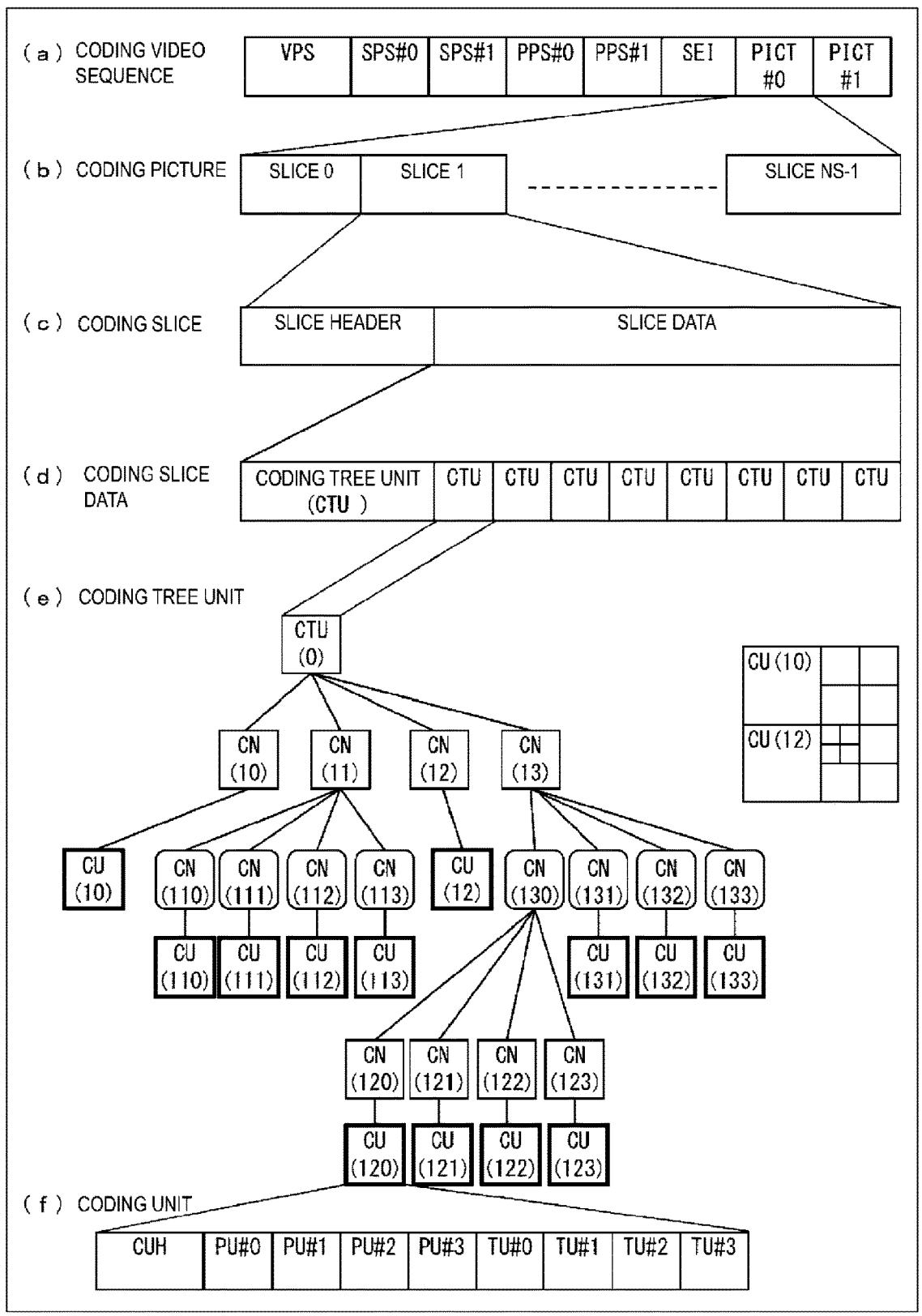
FIG. 1 is a diagram illustrating a hierarchical structure of data of a coding stream according to the present embodiment.

FIG. 1 is a diagram illustrating a hierarchical structure of data of the coding stream Te. The coding stream Te includes a sequence and multiple pictures constituting the sequence illustratively. (a) to (f) of FIG. 1 are diagrams illustrating a coding video sequence defining a sequence SEQ, a coding picture prescribing a picture PICT, a coding slice prescribing a slice S, a coding slice data prescribing slice data, a coding tree unit included in the coding slice data, and a Coding Unit (CU) included in each coding tree unit, respectively.

Coding Video Sequence

In the coding video sequence, a set of data referred to by the image decoding apparatus 31 to decode the sequence SEQ to be processed is defined. As illustrated in (a) of FIG. 1, the sequence SEQ includes a Video Parameter Set, a Sequence Parameter Set SPS, a Picture Parameter Set PPS, a picture PICT, and Supplemental Enhancement Information SEI. Here, a value indicated after # indicates a layer ID. Although an example in which there is coded data of #0 and #1, that is, layer 0 and layer 1, is illustrated in FIG. 1, types of layers and the number of layers are not limited thereto.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of multiple SPSs is selected from the PPS.

In the picture parameter set PPS, a set of coding parameters referred to by the image decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the image decoding apparatus 31 to decode the picture PICT to be processed is defined. As illustrated in (b) of FIG. 1, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted and described. In addition, the same applies to other data with subscripts included in the coding stream Te which will be described below.

Coding Slice

In the coding slice, a set of data referred to by the image decoding apparatus 31 to decode the slice S to be processed is defined. As illustrated in (c) of FIG. 1, the slice S includes a slice header SH and a slice data SDATA.

The slice header SH includes a coding parameter group referred to by the image decoding apparatus 31 to determine a decoding method for a target slice. Slice type specification information (slice_type) indicating a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference to the picture parameter set PPS (pic_parameter_set_id) included in the coding video sequence.

Coding Slice Data

In the coding slice data, a set of data referred to by the image decoding apparatus 31 to decode the slice data SDATA to be processed is defined. As illustrated in (d) of FIG. 1, the slice data SDATA includes Coding Tree Units (CTUs). A CTU is a block of a fixed size (for example, 64×64) constituting a slice, and may be called a Largest Coding Unit (LCU).

Coding Tree Unit

As illustrated in (e) of FIG. 1, a set of data referred to by the image decoding apparatus 31 to decode a coding tree unit to be processed is defined. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also defined as a highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes and is not split any further. The coding unit CU is a basic unit of coding processing.

In addition, in a case that a size of the coding tree unit CTU is 64×64 pixels, a size of the coding unit may be any of 64×64 pixels, 32×32 pixels, 16×16 pixels, and 8×8 pixels.

Coding Unit

As illustrated in (f) of FIG. 1, a set of data referred to by the image decoding apparatus 31 to decode the coding unit to be processed is defined. Specifically, the coding unit includes a prediction tree, a transform tree, and a CU header CUH. In the CU header, a prediction mode, a split method (PU split mode), and the like are defined.

In the prediction tree, prediction information (a reference picture index, a motion vector, and the like) of each prediction unit (PU) obtained by splitting the coding unit into one or more is defined. In another expression, the prediction unit is one or multiple non-overlapping regions constituting the coding unit. In addition, the prediction tree includes one or multiple prediction units obtained by the above-mentioned split. Note that, in the following, a unit of prediction in which the prediction unit is further split is referred to as a "subblock." The subblock includes multiple pixels. In a case that sizes of a prediction unit and a subblock are the same, there is one subblock in the prediction unit. In a case that the prediction unit has a larger size than the subblock, the prediction unit is split into subblocks. For example, in a case that the prediction unit has a size of 8×8, and the subblock has a size of 4×4, the prediction unit is split into four subblocks which include two horizontal splits and two vertical splits.

Prediction processing may be performed for each of such prediction units (subblocks).

Generally speaking, there are two types of splits in the prediction tree, including a case of an intra prediction and a case of an inter prediction. The intra prediction refers to a prediction in an identical picture, and the inter prediction refers to prediction processing performed between different pictures (for example, between pictures of different display times, and between pictures of different layer images).

In a case of the intra prediction, a split method has sizes of 2N×2N (the same size as that of the coding unit) and N×N.

In addition, in a case of the inter prediction, the split method includes coding in a PU split mode (part_mode) of coded data, and has sizes of 2N×2N (the same size as that of the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetric split of 1:3 and 3:1. The PUs included in the CU are expressed as PU0, PU1, PU2, and PU3 sequentially.

Figure 2:
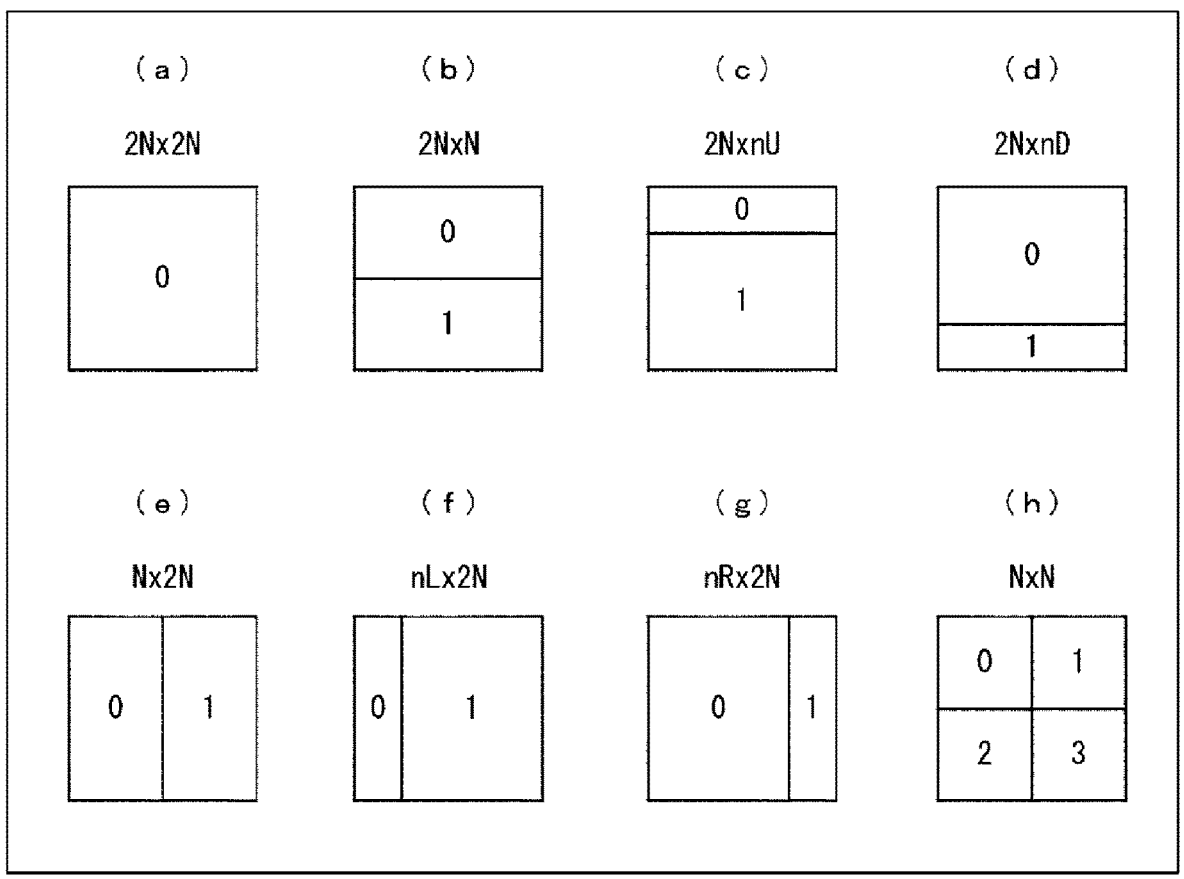
FIG. 2 is a diagram illustrating patterns of PU split modes. (a) to (h) illustrate partition shapes in cases that PU split modes are 2N×2N, 2N×N, 2N×nU, 2N×nD, N×2N, nL×2N, nR×2N, and N×N, respectively.

(a) to (h) of FIG. 2 illustrate shapes of partitions in respective PU split modes (positions of boundaries of PU splits) specifically. (a) of FIG. 2A illustrates a partition of 2N×2N, and (b), (c), and (d) of FIG. 2 illustrate partitions (horizontally long partitions) of 2N×N, 2N×nU, and 2N×nD, respectively. (e), (f), and (g) of FIG. 2 illustrate partitions (vertically long partitions) in cases of N×2N, nL×2N, and nR×2N, respectively, and (h) illustrates a partition of N×N. Note that horizontally long partitions and vertically long partitions are collectively referred to as rectangular partitions, and 2N×2N and N×N are collectively referred to as square partitions.

In addition, in the transform tree, the coding unit is split into one or multiple transform units, and a position and a size of each transform unit are defined. In another expression, the transform unit is one or multiple non-overlapping regions constituting the coding unit. In addition, the transform tree includes one or multiple transform units obtained by the above-mentioned split.

Splits in the transform tree include those to allocate a region in the same size as that of the coding unit as a transform unit, and those by recursive quad tree splits similarly to the above-mentioned split of CUs.

Transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be described below. The inter prediction parameter includes prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters included in a coded data include a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 3:
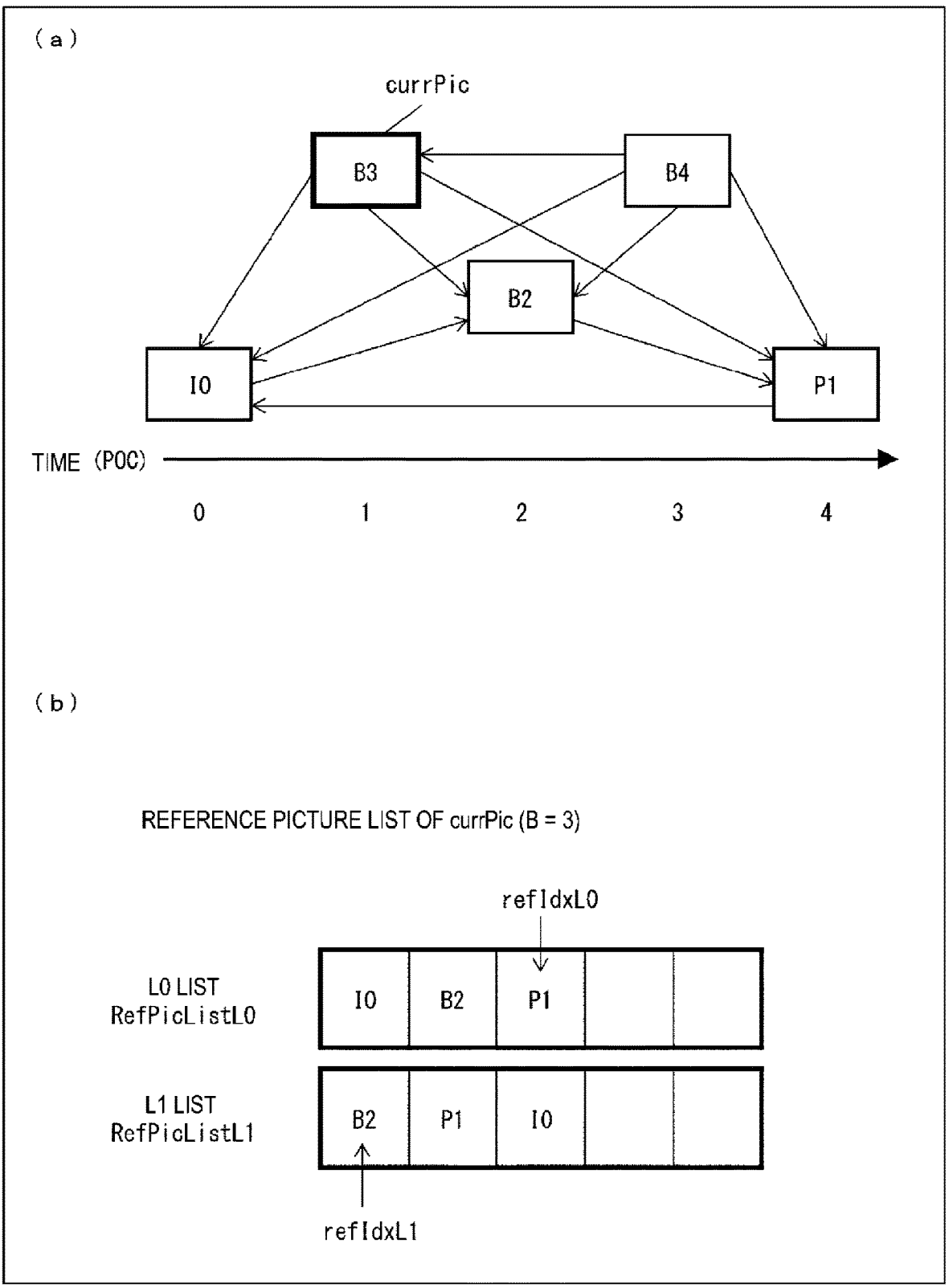
FIG. 3 is a conceptual diagram illustrating an example of reference pictures and reference picture lists.

A reference picture list is a list including reference pictures stored in a reference picture memory 306. FIG. 3 is a conceptual diagram illustrating an example of reference pictures and reference picture lists. In FIG. 3(a), a rectangle indicates a picture, an arrow indicates a reference relationship of a picture, a horizontal axis indicates time, each of I, P, and B in a rectangle indicates an intra-picture, a uni-prediction picture, a bi-prediction picture, and a number in a rectangle indicates a decoding order. As illustrated, the decoding order of the pictures is I0, P1, B2, B3, and B4, and the display order is I0, B3, B2, B4, and P1. FIG. 3(b) indicates an example of reference picture lists. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. For an individual prediction unit, which picture in a reference picture list RefPicListX is actually referred to is specified with a reference picture index refIdxLX. The diagram indicates an example where reference pictures P1 and B2 are referred to by refIdxL0 and refIdxL1.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge prediction mode is a mode to use to derive from prediction parameters of neighboring PUs already processed without including a prediction list utilization flag predFlagLX (or an inter prediction indicator inter_pred_idc), a reference picture index refIdxLX, and a motion vector mvLX in a coded data, and the AMVP mode is a mode to include an inter prediction indicator inter_pred_idc, a reference picture index refIdxLX, a motion vector mvLX in a coded data. Note that, the motion vector mvLX is coded as a prediction vector index mvp_LX_idx identifying a prediction vector mvpLX and a difference vector mvdLX.

The inter prediction indicator inter_pred_idc is a value indicating types and the number of reference pictures, and takes any value of PRED_L0, PRED_L1, and PRED_BI. PRED_L0 and PRED_L1 indicate to uses reference pictures managed in the reference picture list of the L0 list and the L1 list respectively, and indicate to use one reference picture (uni-prediction). PRED_BI indicates to use two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a description method used in a case of not distinguishing the L0 prediction and the L1 prediction, and distinguishes parameters for the L0 list and parameters for the L1 list by replacing LX with L0 and L1.

The merge index merge_idx is an index to indicate to use either prediction parameter as a prediction parameter of a decoding target PU among prediction parameter candidates (merge candidates) derived from PUs of which the processing is completed.

Motion Vector

The motion vector mvLX indicates a gap quantity between blocks in two different pictures. A prediction vector and a difference vector related to the motion vector mvLX are referred to as a prediction vector mvpLX and a difference vector mvdLX respectively.

Inter Prediction Indicator inter_pred_idc and Prediction List Utilization Flag predFlagLX A relationship between an inter prediction indicator inter_pred_idc and prediction list utilization flags predFlagL0 and predFlagL1 are as follows, and those can be converted mutually.

inter_pred_idc=(predFlagL1<<1)+predFlagL0 predFlagL0=inter_pred_idc&1 predFlagL1=inter_pred_idc>>1

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following equation.

biPred=(predFlagL0==1&&predFlagL1==1)

The flag biPred can be also derived from whether an inter prediction indicator is a value indicating to use two prediction lists (reference pictures). For example, the flag can be derived by the following equation.

biPred=(inter_pred_idc==PRED_BI)?1:0

The equation can be also expressed with the following equation.

biPred=(inter_pred_idc==PRED_BI)

Note that, for example, PRED_BI can use the value of 3.

Configuration of Image Decoding Apparatus

Figure 5:
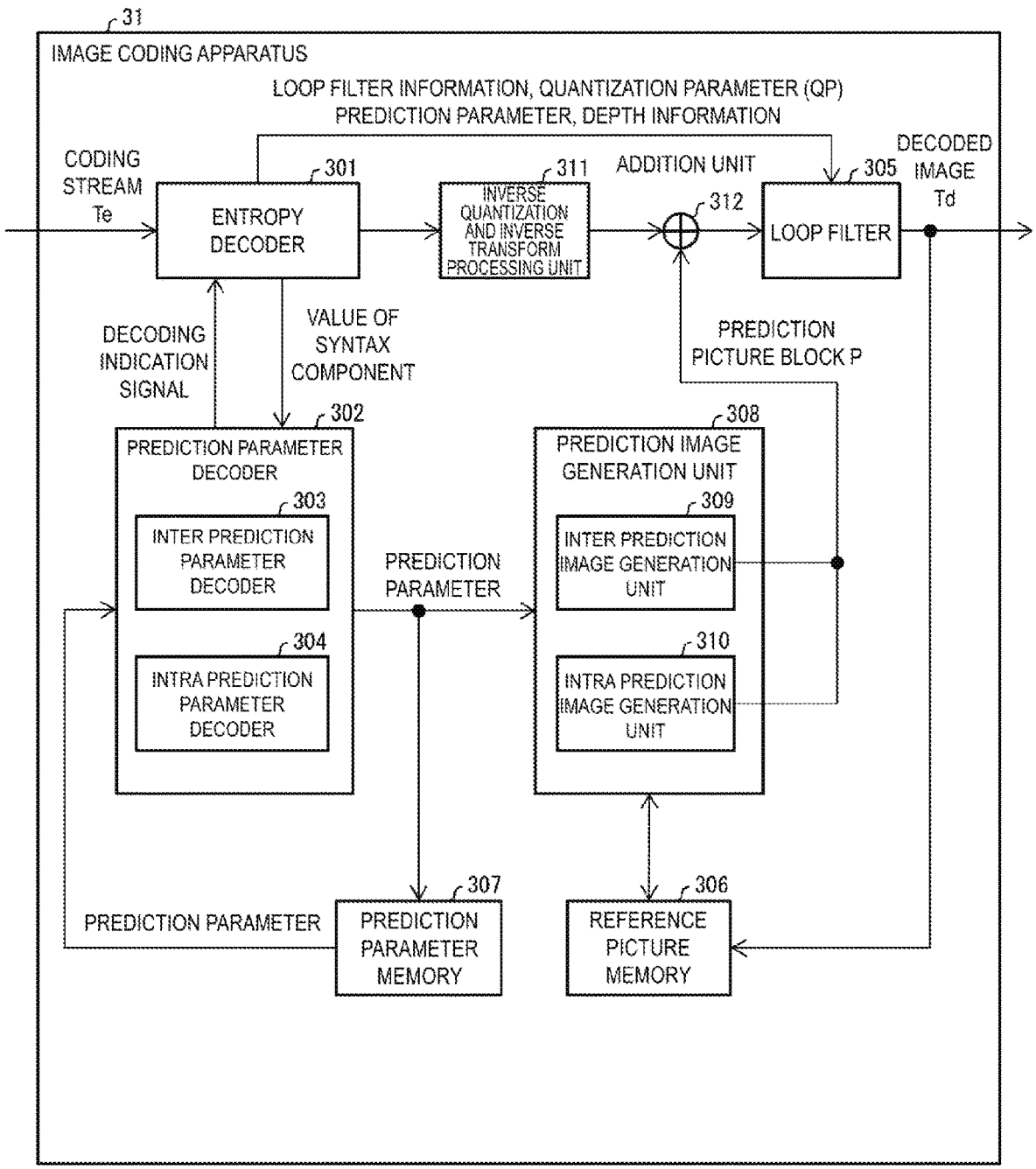
FIG. 5 is a schematic diagram illustrating a configuration of an image decoding apparatus according to the first embodiment.

Next, a configuration of the image decoding apparatus 31 according to the present embodiment will be described. FIG. 5 is a schematic diagram illustrating a configuration of the image decoding apparatus 31 according to the present embodiment. The image decoding apparatus 31 includes an entropy decoder 301, a prediction parameter decoder (a prediction image decoding apparatus) 302, a loop filter 305 (an image filtering apparatus), a reference picture memory 306, a prediction parameter memory 307, a prediction image generation unit (a prediction image generation apparatus) 308, an inverse quantization and inverse transform processing unit 311, and an addition unit 312.

In addition, the prediction parameter decoder 302 includes an inter prediction parameter decoder 303 and an intra prediction parameter decoder 304. The prediction image generation unit 308 includes an inter prediction image generation unit 309 and an intra prediction image generation unit 310.

The entropy decoder 301 performs entropy decoding on the coding stream Te input from the outside and separates and decodes individual codes (syntax components). The separated codes include prediction information to generate a prediction image and residual information to generate a difference image and the like.

The entropy decoder 301 outputs a part of the separated codes to the prediction parameter decoder 302. For example, a part of the separated codes includes loop filter information indicating a filter coefficient, ON/OFF of a filter, and the like in filtering processing performed in the image coding apparatus 11 to be described later, a quantization parameter (QP), a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. Which code is to be decoded is controlled based on an indication of the prediction parameter decoder 302. The entropy decoder 301 outputs quantization coefficients to the inverse quantization and inverse transform processing unit 311. These quantization coefficients are coefficients obtained by performing a frequency transform such as a Discrete Cosine Transform (DCT), a Discrete Sine Transform (DST), or a Karyhnen Loeve Transform (KLT) on residual signals to quantize the signals in coding processing.

Further, the entropy decoder 301 outputs a part of the separated codes to the loop filter 305 to be described later. Examples of a part of the separated codes include loop filter information, a quantization parameter (QP), a prediction parameter, and a depth information (split information).

The inter prediction parameter decoder 303 decodes an inter prediction parameter with reference to a prediction parameter stored in the prediction parameter memory 307, based on a code input from the entropy decoder 301.

The inter prediction parameter decoder 303 outputs a decoded inter prediction parameter to the prediction image generation unit 308, and also stores the decoded inter prediction parameter in the prediction parameter memory 307.

The intra prediction parameter decoder 304 decodes an intra prediction parameter with reference to a prediction parameter stored in the prediction parameter memory 307, based on a code input from the entropy decoder 301. The intra prediction parameter is a parameter used in processing to predict a CU in one picture, for example, an intra prediction mode IntraPredMode. The intra prediction parameter decoder 304 outputs a decoded intra prediction parameter to the prediction image generation unit 308, and also stores the decoded intra prediction parameter in the prediction parameter memory 307.

The intra prediction parameter decoder 304 may derive different intra prediction modes depending on luminance and chrominance. In this case, the intra prediction parameter decoder 304 decodes a luminance prediction mode IntraPredModeY as a prediction parameter of luminance and decodes a chrominance prediction mode IntraPredModeC as a prediction parameter of chrominance. The luminance prediction mode IntraPredModeY includes 35 modes, and corresponds to a planar prediction (0), a DC prediction (1), and directional predictions (2 to 34). The chrominance prediction mode IntraPredModeC uses any of the planar prediction (0), the DC prediction (1), the directional predictions (2 to 34), and an LM mode (35). The intra prediction parameter decoder 304 may decode a flag indicating whether IntraPredModeC is the same mode as the luminance mode, assign IntraPredModeY to IntraPredModeC in a case of that the flag indicates the same mode as the luminance mode, and decode the planar prediction (0), the DC prediction (1), the directional predictions (2 to 34), and the LM mode (35) as IntraPredModeC in a case of that the flag indicates a different mode from the luminance mode.

The loop filter 305 acquires loop filter information from the entropy decoder 301. The loop filter 305 uses the decoded image of the CU generated by the addition unit 312 as an input image (unfiltered image), performs processing indicated by the loop filter information on the unfiltered image, and outputs an output image (filtered image). The loop filter 305 has a function similar to the function of a loop filter 107 of the image coding apparatus 11 to be described later. A detailed configuration of the loop filter 305 will be described later.

The reference picture memory 306 stores a decoded image of the CU generated by the addition unit 312 in a predetermined position for each picture and CU to be decoded.

The prediction parameter memory 307 stores a prediction parameter in a predetermined position for each picture and prediction unit (or a subblock, a fixed size block, and a pixel) to be decoded. Specifically, the prediction parameter memory 307 stores an inter prediction parameter decoded by the inter prediction parameter decoder 303, an intra prediction parameter decoded by the intra prediction parameter decoder 304 and a prediction mode predMode separated by the entropy decoder 301. For example, stored inter prediction parameters include a prediction list use flag predFlagLX (inter prediction indicator inter_pred_idc), a reference picture index refIdxLX, and a motion vector mvLX.

The prediction image generation unit 308 receives input of a prediction mode predMode from the entropy decoder 301 and a prediction parameter from the prediction parameter decoder 302. In addition, the prediction image generation unit 308 reads a reference picture from the reference picture memory 306. The prediction image generation unit 308 generates a prediction image of a PU or a subblock by using the input prediction parameter and the read reference picture (reference picture block) in the prediction mode indicated by the prediction mode predMode.

Here, in a case that the prediction mode predMode indicates an inter prediction mode, the inter prediction image generation unit 309 generates a prediction image of a PU or a subblock using an inter prediction by using the inter prediction parameter input from the inter prediction parameter decoder 303 and the read reference picture (reference picture block).

For a reference picture list (an L0 list or an L1 list) in which the prediction list use flag predFlagLX is 1, the inter prediction image generation unit 309 reads, from the reference picture memory 306, a reference picture block at a position indicated by a motion vector mvLX with reference to the PU to be decoded in the reference picture indicated by the reference picture index refIdxLX. The inter prediction image generation unit 309 performs a prediction based on a read reference picture block and generates a prediction image of the PU. The inter prediction image generation unit 309 outputs the generated prediction image of the PU to the addition unit 312. Here, the reference picture block refers to a set of pixels (referred to as a block because they are normally rectangular) on a reference picture and is a region that is referred to generate a prediction image of a PU or a subblock.

In a case that the prediction mode predMode indicates an intra prediction mode, the intra prediction image generation unit 310 performs an intra prediction by using an intra prediction parameter input from the intra prediction parameter decoder 304 and a read reference picture. Specifically, the intra prediction image generation unit 310 reads, from the reference picture memory 306, a PU, which is a picture to be decoded, and a PU neighboring a PU to be decoded in a predetermined range among PUs that have already been decoded. The predetermined range is, for example, any of neighboring PUs on left, top left, top, and top right sides in a case that a PU to be decoded sequentially moves in an order of a so-called raster scan and varies according to intra prediction modes. The order of the raster scan is an order of sequential movement from the left edge to the right edge in each picture for each row from the top edge to the bottom edge.

The intra prediction image generation unit 310 performs a prediction in a prediction mode indicated by the intra prediction mode IntraPredMode based on a read neighboring PU and generates a prediction image of a PU. The intra prediction image generation unit 310 outputs the generated prediction image of the PU to the addition unit 312.

In a case that the intra prediction parameter decoder 304 derives different intra prediction modes depending on luminance and chrominance, the intra prediction image generation unit 310 generates a prediction image of a PU of luminance by any of a planar prediction (0), a DC prediction (1), and directional predictions (2 to 34) in accordance with a luminance prediction mode IntraPredModeY, and generates a prediction image of a PU of chrominance by any of a planar prediction (0), a DC prediction (1), directional predictions (2 to 34), and an LM mode (35) in accordance with a chrominance prediction mode IntraPredModeC.

The inverse quantization and inverse transform processing unit 311 performs inverse quantization on a quantization coefficient input from the entropy decoder 301 to calculate a transform coefficient. The inverse quantization and inverse transform processing unit 311 performs an inverse frequency transform such as an inverse DCT, an inverse DST, or an inverse KLT on the calculated transform coefficient to calculate a residual signal. The inverse quantization and inverse transform processing unit 311 outputs the calculated residual signal to the addition unit 312.

The addition unit 312 adds the prediction image of the PU input from the inter prediction image generation unit 309 or the intra prediction image generation unit 310 to the residual signal input from the inverse quantization and inverse transform processing unit 311 for each pixel and generates a decoded image of the PU. The addition unit 312 stores the generated decoded image of a PU in the reference picture memory 306, and outputs a decoded image Td where the generated decoded image of the PU is integrated for each picture to the outside.

Configuration of Loop Filter 305

Figure 6:
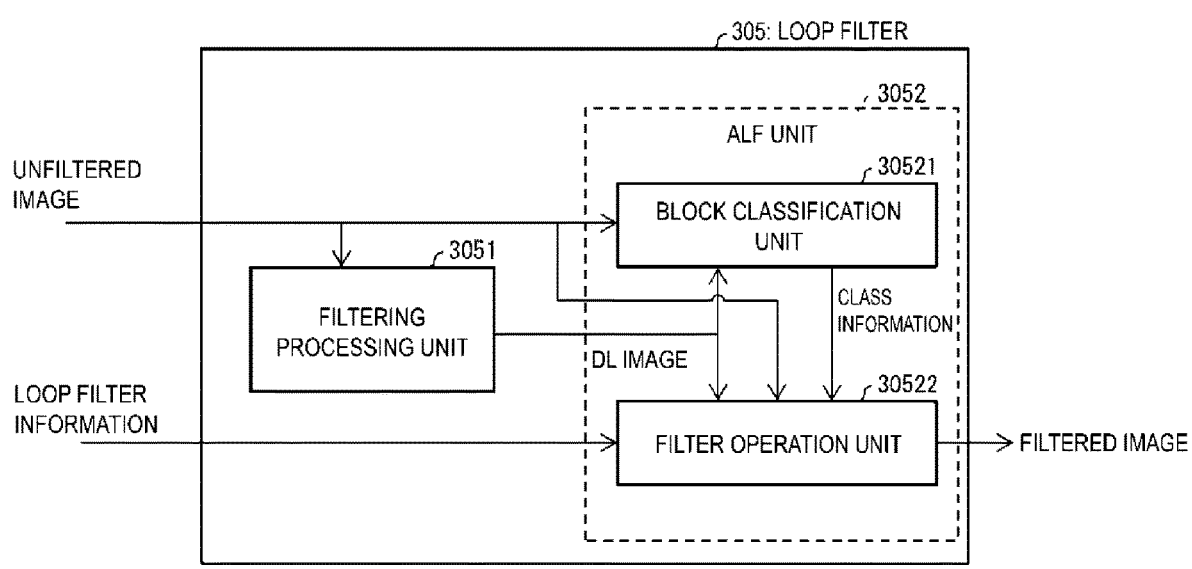
FIG. 6 is a schematic diagram illustrating a configuration of a loop filter of the image decoding apparatus according to the first embodiment.

A detailed configuration of the loop filter 305 will be described. FIG. 6 is a schematic diagram illustrating a configuration of the loop filter 305 of the image decoding apparatus 31 according to the present embodiment. The loop filter 305 includes a filtering processing unit 3051 and an ALF unit 3052.

The filtering processing unit 3051 functions as a filter to be applied to the unfiltered image. The filtering processing unit 3051 includes a neural network that receives input of one or multiple pieces of first-type input image data having luminance or chrominance as a pixel value and that outputs one or multiple pieces of first-type output image data having luminance or chrominance as a pixel value. The filtering processing unit 3051 is also referred to as a Deep Neural Network (DNN) filter. The filtering processing unit 3051 outputs an image obtained by applying the filter to the unfiltered image as a DL image.

Examples of three types of DNNs are listed below. The filtering processing unit 3051, however, is not limited to any of the following types.

Fully Convolutional Network (FCN) which has a configuration in which neurons belonging to a layer are connected to all the inputs in the layer Locally Connected Networks (LCN) which has a configuration in which neurons belonging to a layer are connected to only some of the inputs in the layer (that is, a configuration in which the neurons have spatial positions, and the neurons are connected to only inputs that are close to the spatial positions)

Convolutional Neural Networks (CNN) which has a configuration in which neurons belonging to a layer are connected to only some of the inputs in the layer and share weights as well (a configuration in which neurons have spatial positions and are connected to only inputs that are close to the spatial positions, with neurons having different spatial positions having a similar configuration). Further, the DNN filter may also be referred to as a filter configured using a neural network of a multi-stage configuration (NN processing). Note that the neural network refers to processing configured by a non-linear operation (activation) based on results of a product-sum operation and a product-sum operation, and may include elements such as conv, act, add/sub, and concatenate/stack. The FCN, the CNN, and the LCN described above are classified according to connection relationships of networks configured using the NN processing.

In a case that the DNN filter is applied to an input image, the DNN filter may be applied to one (for example, Y) of color components (Y, U, V) of the input image. Further, the DNN filter may be sequentially applied to each of Y, U, and V. Further, the DNN filter may be applied to multiple components at one time by using a {Y, U, V} image obtained by interleaving Y, U, and V. Further, the DNN filter may be applied to a Y image, and the DNN filter may be applied to a {U, V} image obtained by interleaving U and V. Further, as will be described later, in addition to the input image, a coding parameter such as a quantization parameter (QP) may be input to the DNN filter. In this case, the DNN filter may be applied to images (for example, a {Y, QP} image, a {U, QP} image, and a {V, QP} image) obtained by interleaving each of the color components and the coding parameter. Further, in a similar manner, the DNN filter may be applied to a {Y, U, V, QP} image and a {U, V, QP} image. Further, the color components are not limited to Y, U, and V, and may be R, G, and B.

As will be described later, the input image data of the DNN filter may include the coding parameter such as the quantization parameter.

The ALF unit 3052 applies an Adaptive Loop Filter (ALF) to the unfiltered image and the DL image output from the filtering processing unit 3051. The ALF unit 3052 includes a block classification unit 30521 and a filter operation unit 30522. The ALF filter applied by the ALF unit 3052 refers to a filter that uses input filter coefficients to perform filtering processing including product-sum operation (and optionally, offset addition) of multiple reference pixels around a target pixel and the filter coefficients.

The block classification unit 30521 performs classification into 25 classes for each prescribed unit (for example, for each 2×2 block). Further, the block classification unit 30521 outputs class information indicating the classified classes. Specifically, the block classification unit 30521 calculates class C, based on the following expressions and steps.

Expression 1

$$g_v = \sum_{k=i-2}^{i+3} \sum_{l=j-2}^{j+3} V_{k,l}, \quad V_{k,l} = |2R(k, l) - R(k, l-1) - R(k, l+1)|, \quad (1)$$

$$g_h = \sum_{k=i-2}^{i+3} \sum_{l=j-2}^{j+3} H_{k,l}, \quad H_{k,l} = |2R(k, l) - R(k-1, l) - R(k+1, l)|, \quad (2)$$

$$g_{d1} = \sum_{k=i-2}^{i+3} \sum_{l=j-2}^{j+3} D1_{k,l}, \quad (3)$$

$$D1_{k,l} = |2R(k, l) - R(k-1, l-1) - R(k+1, l+1)|$$

$$g_{d2} = \sum_{k=i-2}^{i+3} \sum_{l=j-2}^{j+3} D2_{k,l}, \quad (4)$$

$$D2_{k,l} = |2R(k, l) - R(k-1, l+1) - R(k+1, l-1)|$$

$$g_{h,v}^{max} = \max(g_h, g_v), \quad g_{h,v}^{min} = \min(g_h, g_v), \quad (5)$$

$$g_{d0,d1}^{max} = \max(g_{d0}, g_{d1}), \quad g_{d0,d1}^{min} = \min(g_{d0}, g_{d1}), \quad (6)$$

Step 1. If both $g_{h,v}^{max} \leq t_1 \cdot g_{h,v}^{max}$ and $g_{d0,d1}^{max} \leq t_1 \cdot g_{d0,d1}^{min}$ are true, $D$ is set to 0.

Step 2. If $g_{h,v}^{max}/g_{h,v}^{min} > g_{d0,d1}^{max}/g_{d0,d1}^{min}$, continue from Step 3, otherwise continue from Step 4.

Step 3. If $g_{h,v}^{max} > t_2 \cdot g_{h,v}^{min}$, $D$ is set to 2, otherwise $D$ is set to 1.

Step 4. If $g_{d0,d1}^{max} > t_2 \cdot g_{d0,d1}^{min}$, $D$ is set to 4, otherwise $D$ is set to 3.

Step 5. $C = 5D + \hat{A}$, $$A = \sum_{k=i-2}^{i+3} \sum_{l=j-2}^{j+3} (V_{k,l} + H_{k,l}). \text{ is quantized to the range}$$

of 0 to 4 and denoted as $\hat{A}$.

Here, v represents a vertical direction, h represents a horizontal direction, and d1 and d2 each represent a diagonal direction at an angle of 45 degrees. The block classification unit 30521 calculates an activity ratio of each by using the expressions (1) to (6). Based on the calculated activity ratio and direction, the block classification unit 30521 calculates D indicating directivity (quantized to 0 to 4) by performing Steps 1 to 4. Then, the block classification unit 30521 performs Step 5, and calculates A indicating an activity ratio (quantized to 0 to 4) and class C. D and A each have a value of 0 to 4, and thus C has a value of 0 to 24, resulting in classification of 25 classes. Note that the ALF unit 3052 may omit the block classification unit 30521.

The filter operation unit 30522 calculates a filter coefficient by referring to the loop filter information and the class information, applies a filter according to the calculated filter coefficient to one or more input images (DL images and unfiltered images), and outputs a filtered image. In other words, the filter operation unit 30522 performs operation on the input image while switching the filter coefficients for each prescribed unit by referring to the class information.

Shape of Filter

Figure 8:
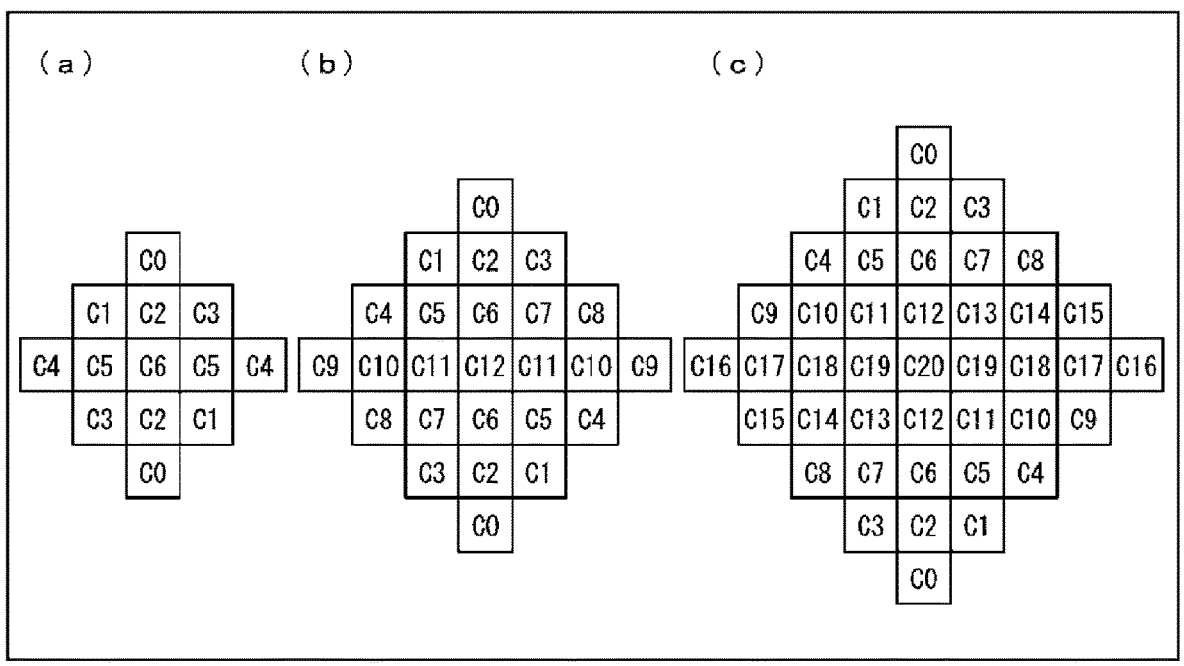
FIG. 8 is a diagram illustrating examples of filter shapes of an image filtering apparatus according to the first embodiment.

FIG. 8 is a diagram illustrating examples of filter shapes used in the image filtering apparatus (filter operation unit) according to the present embodiment. The filter shape refers to pixels that are referred to in a case of filtering processing on a certain filter target pixel.

FIG. 8 illustrates diamond filter shapes. (a) of FIG. 8 illustrates a filter shape of 5×5 pixels, (b) of FIG. 8 illustrates a filter shape of 7×7 pixels, and (c) of FIG. 8 illustrates a filter shape of 9×9 pixels. As illustrated in FIG. 8, a filter coefficient is assigned to each pixel. FIG. 8 is merely an example, and a rectangular shape, a cruciform shape, a circular shape, a modified shape of those shapes, or the like may be used as the filter shape as well.

Configuration of Image Coding Apparatus

Figure 4:
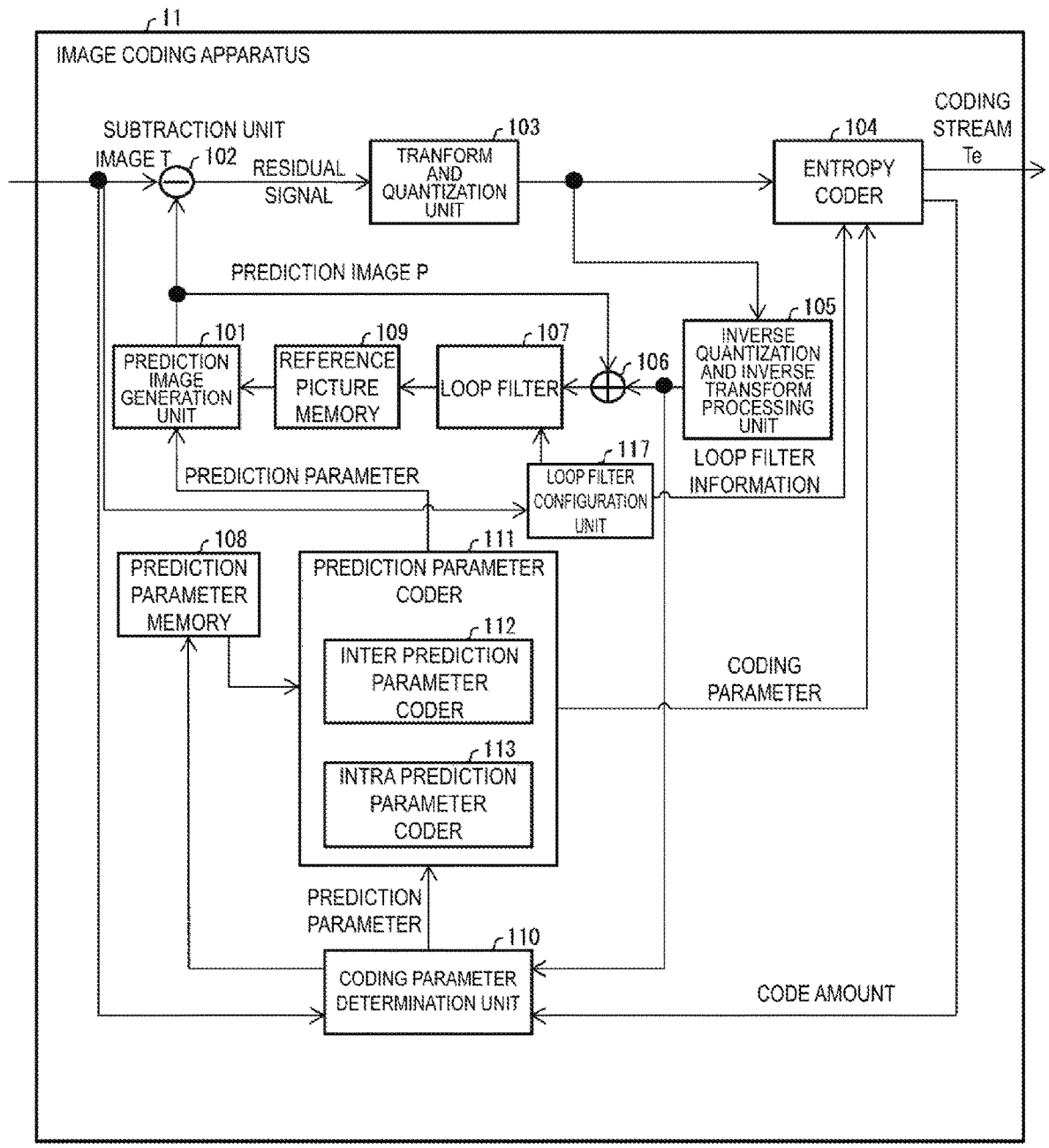
FIG. 4 is a block diagram illustrating a configuration of an image coding apparatus according to a first embodiment.

Next, a configuration of the image coding apparatus 11 according to the present embodiment will be described. FIG. 4 is a block diagram illustrating a configuration of the image coding apparatus 11 according to the present embodiment. The image coding apparatus 11 is configured to include a prediction image generation unit 101, a subtraction unit 102, a transform and quantization unit 103, an entropy coder 104, an inverse quantization and inverse transform processing unit 105, an addition unit 106, a loop filter 107 (an image filtering apparatus), a prediction parameter memory (a prediction parameter storage unit and a frame memory) 108, a reference picture memory (a reference image storage unit and a frame memory) 109, a coding parameter determination unit 110, a prediction parameter coder 111, and a loop filter configuration unit 117. The prediction parameter coder 111 includes an inter prediction parameter coder 112 and an intra prediction parameter coder 113.

For each picture of an image T, the prediction image generation unit 101 generates a prediction image P of a prediction unit PU for each coding unit CU that is a region obtained by splitting the picture. Here, the prediction image generation unit 101 reads a block that has been decoded from the reference picture memory 109 based on a prediction parameter input from the prediction parameter coder 111. For example, in a case of an inter prediction, the prediction parameter input from the prediction parameter coder 111 is a motion vector. The prediction image generation unit 101 reads a block at a position in a reference image indicated by the motion vector starting from a target PU. In addition, in a case of an intra prediction, the prediction parameter is, for example, an intra prediction mode. A pixel value of a neighboring PU used in the intra prediction mode is read from the reference picture memory 109, and the prediction image P of the PU is generated. The prediction image generation unit 101 generates the prediction image P of the PU by using one prediction scheme among multiple prediction schemes for a read reference picture block. The prediction image generation unit 101 outputs the generated prediction image P of the PU to the subtraction unit 102. Note that the operation of the prediction image generation unit 101 is the same as that of the prediction image generation unit 308 already described.

The prediction image generation unit 101 generates a prediction image P of a PU based on a pixel value of a reference block read from the reference picture memory, using a parameter input by the prediction parameter coder. The prediction image generated by the prediction image generation unit 101 is output to the subtraction unit 102 and the addition unit 106.

The subtraction unit 102 subtracts a signal value of the prediction image P of the PU input from the prediction image generation unit 101 from a pixel value of a corresponding PU of the image T to generate a residual signal.

The subtraction unit 102 outputs the generated residual signal to the transform and quantization unit 103.

The transform and quantization unit 103 performs a frequency transform on the residual signal input from the subtraction unit 102 to calculate a transform coefficient. The transform and quantization unit 103 quantizes the calculated transform coefficient to obtain a quantization coefficient. The transform and quantization unit 103 outputs the obtained quantization coefficient to the entropy coder 104 and the inverse quantization and inverse transform processing unit 105.

To the entropy coder 104, the quantization coefficient is input from the transform and quantization unit 103, and coding parameters are input from the prediction parameter coder 111. For example, input coding parameters include codes such as a quantization parameter, depth information (split information), a reference picture index refIdxLX, a prediction vector index mvp_LX_idx, a difference vector mvdLX, a prediction mode predMode, and a merge index merge_idx. Further, the entropy coder 104 receives input of the loop filter information from the loop filter configuration unit 117.

The entropy coder 104 performs entropy coding on the input quantization coefficients and coding parameters to generate the coding stream Te, and outputs the generated coding stream Te to the outside.

The inverse quantization and inverse transform processing unit 105 performs inverse quantization on the quantization coefficient input from the transform and quantization unit 103 to obtain a transform coefficient. The inverse quantization and inverse transform processing unit 105 performs an inverse frequency transform on the obtained transform coefficient to calculate a residual signal. The inverse quantization and inverse transform processing unit 105 outputs the calculated residual signal to the addition unit 106.

The addition unit 106 adds a signal value of the prediction image P of the PU input from the prediction image generation unit 101 to a signal value of the residual signal input from the inverse quantization and inverse transform processing unit 105 for each pixel and generates a decoded image. The addition unit 106 stores the generated decoded image in the reference picture memory 109.

The loop filter 107 applies the DNN filter and the adaptive loop filter (ALF filter) to the decoded image generated by the addition unit 106.

The loop filter configuration unit 117 refers to the decoded image and a source image input to the image coding apparatus 11, controls whether or not to apply a filter in the loop filter 107, and configures filter coefficients in a case of applying the filter in the loop filter 107.

Note that the loop filter 107 and the loop filter configuration unit 117 may be collectively referred to as an image filtering apparatus. The details of the loop filter 107 and the loop filter configuration unit 117 will be described later with reference to other figures.

The prediction parameter memory 108 stores the prediction parameters generated by the coding parameter determination unit 110 for each picture and CU to be coded at a predetermined position.

The reference picture memory 109 stores the decoded image generated by the loop filter 107 for each picture and CU to be coded at a predetermined position.

The coding parameter determination unit 110 selects one set among multiple sets of coding parameters. A coding parameter refers to the above-mentioned prediction parameter or a parameter to be coded, the parameter being generated in association with the prediction parameter. The prediction image generation unit 101 generates the prediction image P of the PU by using each of the sets of the coding parameters.

The coding parameter determination unit 110 calculates, for each of the multiple sets, a cost value indicating the magnitude of an amount of information and a coding error. A cost value is, for example, the sum of a code amount and the value obtained by multiplying a coefficient λ by a square error. The code amount is an amount of information of the coding stream Te obtained by performing entropy coding on a quantization error and a coding parameter. The square error is the sum of pixels for square values of residual values of residual signals calculated in the subtraction unit 102. The coefficient λ is a real number greater than a preconfigured zero. The coding parameter determination unit 110 selects a set of coding parameters of which cost value calculated is a minimum value. With this configuration, the entropy coder 104 outputs the selected set of coding parameters as the coding stream Te to the outside and does not output an unselected set of coding parameters. The coding parameter determination unit 110 stores the determined coding parameters in the prediction parameter memory 108.

The prediction parameter coder 111 derives a format for coding from parameters input from the coding parameter determination unit 110 and outputs the format to the entropy coder 104. The derivation of the format for coding is, for example, to derive a difference vector from a motion vector and a prediction vector. The prediction parameter coder 111 derives parameters necessary to generate a prediction image from parameters input from the coding parameter determination unit 110 and outputs the parameters to the prediction image generation unit 101. A parameter necessary to generate a prediction image is, for example, a motion vector of a subblock unit.

The inter prediction parameter coder 112 derives inter prediction parameters such as a difference vector based on the prediction parameters input from the coding parameter determination unit 110. The inter prediction parameter coder 112 includes a partly identical configuration to a configuration in which the inter prediction parameter decoder 303 (see FIG. 5 and the like) derives inter prediction parameters, as a configuration for deriving parameters necessary for generation of a prediction image output to the prediction image generation unit 101.

The intra prediction parameter coder 113 derives a format for coding (for example, MPM_idx, rem_intra_luma_pred_mode, or the like) from the intra prediction mode IntraPredMode input from the coding parameter determination unit 110.

Configuration of Loop Filter 107 and Loop Filter Configuration Unit 117

Figure 7:
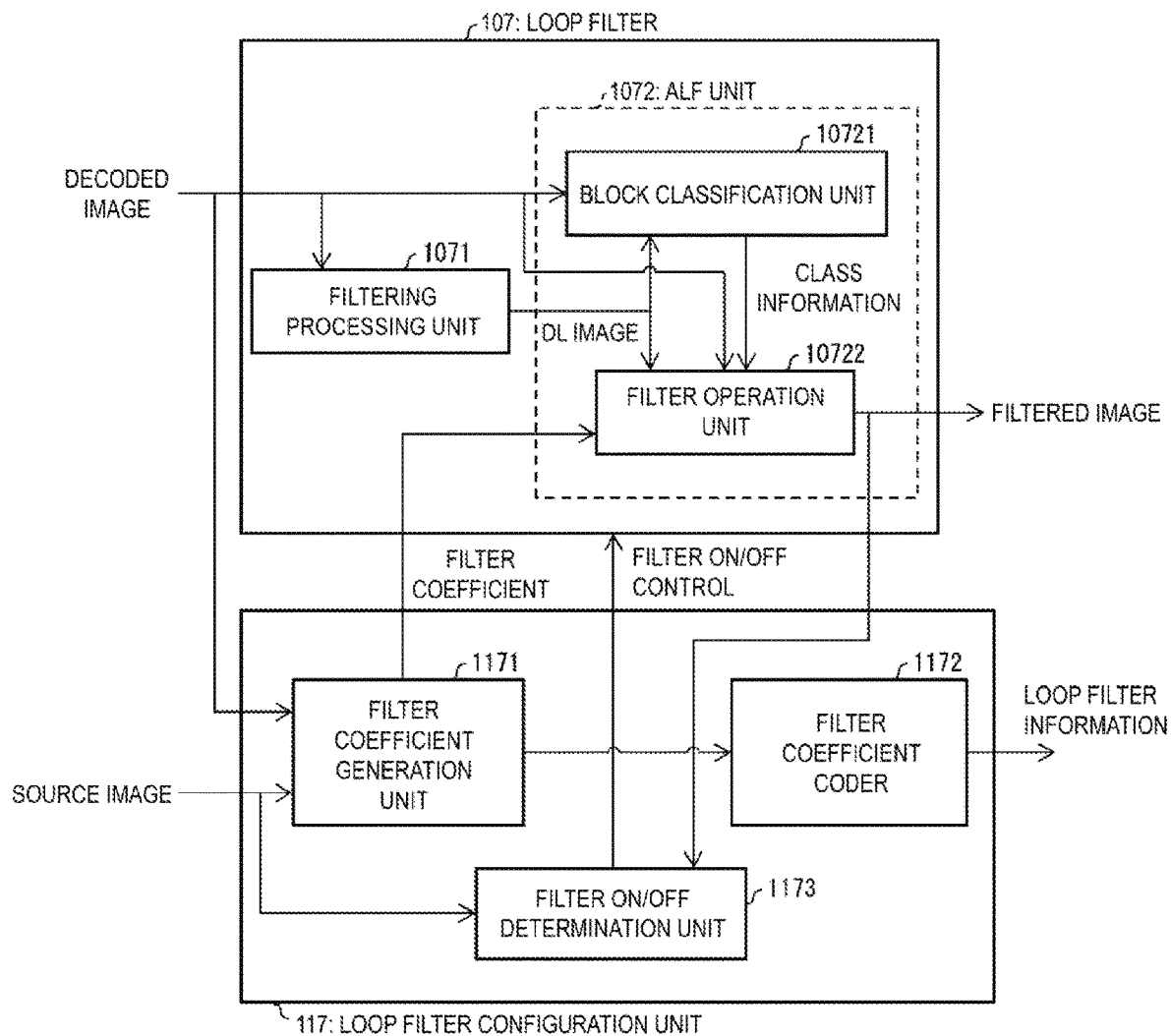
FIG. 7 is a schematic diagram illustrating a configuration of a loop filter and a loop filter configuration unit of the image decoding apparatus according to the first embodiment.

A detailed configuration of the loop filter 107 and the loop filter configuration unit 117 will be described. FIG. 7 is a schematic diagram illustrating a configuration of the loop filter 107 and the loop filter configuration unit 117 of the image coding apparatus 11 according to the present embodiment.

The loop filter 107 has a function similar to the function of the loop filter 305 described above.

The loop filter configuration unit 117 includes a filter coefficient generation unit 1171, a filter coefficient coder 1172, and a filter ON/OFF determination unit 1173.

The filter coefficient generation unit 1171 refers to a decoded image and a source image input to the image coding apparatus 11, and generates filter coefficients of a filter to be applied in a filter operation unit 10722 of the loop filter 107.

The filter coefficient coder 1172 codes the filter coefficients output from the filter coefficient generation unit 1171, and outputs the coded filter coefficients as the loop filter information.

The filter ON/OFF determination unit 1173 refers the source image input to the image coding apparatus 11, and controls whether or not to apply a filter in the loop filter 107. Further, the filter ON/OFF determination unit 1173 may also refer to a filtered decoded image output by the filter operation unit 10722, and control whether or not to apply a filter in the loop filter 107.

Loop Filter Information

The filter coefficient coder 1172 can generate the loop filter information indicating a maximum of 25 sets of luminance filter coefficients. Further, the filter coefficient coder 1172 may generate the loop filter information in which filter coefficients of a certain class are merged with filter coefficients of a different class. Further, the filter coefficient coder 1172 may generate the loop filter information by using filter coefficients that have been stored for the reference picture.

After decoding a picture, the filter coefficient coder 1172 may add a filter set corresponding to the filter applied to the picture to a list for the sake of temporal prediction. The filter coefficient coder 1172 may adopt an (FIFO) configuration in which the oldest filter set in decoding order is overwritten by a new filter set in a case that the size of the list reaches a maximum allowable value.

Note that temporal prediction of the filter coefficients may be performed only in a case of a P slice and a B slice. Further, in a case of an I slice, 16 fixed filter sets may be assigned to each class. Further, the filter coefficient coder 1172 may use different filter coefficients for luminance and chrominance. In this case, the filter coefficient coder 1172 may be turned on or off for each CU unit and/or slice unit for luminance, and may be turned on or off only for each CTU unit and/or slice unit for chrominance.

Configuration of Loop Filter 107a

Figure 9:
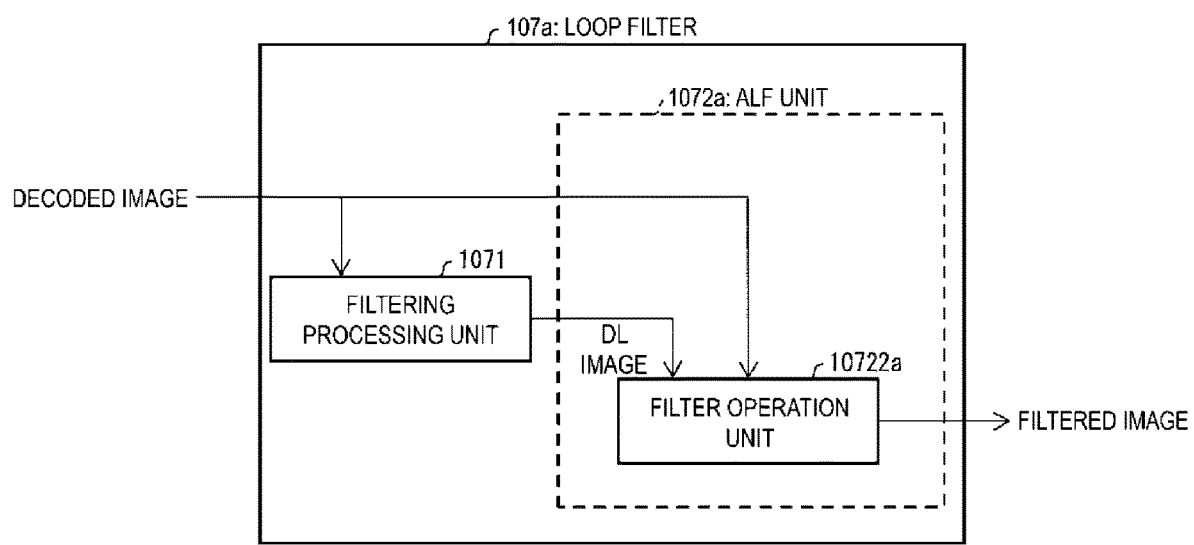
FIG. 9 is a schematic diagram illustrating a configuration of a loop filter of the image filtering apparatus according to the first embodiment.

A detailed configuration of a loop filter 107a according to the present embodiment will be described. FIG. 9 is a schematic diagram illustrating a configuration of the loop filter 107a of the image filtering apparatus according to the present embodiment. As described above, the loop filter may omit the block classification unit 30521. Thus, here, the loop filter 107a omitting the block classification unit 30521 will be described. As illustrated in FIG. 9, the loop filter 107a includes an ALF unit 1072a omitting the block classification unit 30521 and a filtering processing unit 1071.

As illustrated in FIG. 9, the filtering processing unit 1071 receives input of a decoded image, and outputs a DL image filtered with the DNN filter. Further, the filter operation unit 10722a receives input of the decoded image and the DL image output from the filtering processing unit 1071. Further, the filter operation unit 10722a refers to the input decoded image and DL image, and outputs a filtered image. Accordingly, for example, in a case that an intense filter is applied in the filtering processing unit 1071, a moderate filter can be applied in the filter operation unit 10722a for compensation. In contrast, in a case that a moderate filter is applied in the filtering processing unit 1071, an intense filter can be applied in the filter operation unit 10722a for compensation.

In this manner, in the loop filter 107a according to the present embodiment, image quality of the filtered image can be enhanced. Specifically, in the loop filter 107a, the loop filter 107a that in many cases has high image quality but does not have flexibility regarding the filter input image (decoded image of FIG. 9) and the filter operation unit 10722a having flexibility are combined together, with the result that filtering processing having flexibility and high image quality can be implemented. Note that it is also possible to adopt a simple serial configuration of causing the filter operation unit 10722a to perform operation on a post-processing image (DL image) of the filtering processing unit 1071. With this configuration, however, information may be lost in the filtering processing of the filtering processing unit 1071. For this reason, the present configuration of also inputting a pre-processing image (input decoded image) of the filtering processing unit 1071 to the filter operation unit 10722a provides higher performance. Further, in the loop filter 107a, the filtering processing unit 1071 can be caused to perform the filtering processing that is originally performed by the ALF unit 1072a. Thus, the configuration of the ALF unit 1072a can be simplified.

Note that the decoded image to be input to the filtering processing unit 1071 may be a decoded image after being filtered with a deblocking filter, a bilateral filter, an SAO, or the like, or may be a decoded image before being filtered with such filters.

Note that the loop filter 107a illustrated in FIG. 9 is the loop filter 107a of the image coding apparatus. As for the loop filter configuration unit 117, illustration thereof is omitted since the loop filter configuration unit 117 is the same as that illustrated in FIG. 7 described above. This holds true in the following embodiments and modifications as well unless otherwise specifically noted.

In addition, unless otherwise specifically noted, as described above, the loop filter in the coding apparatus and the loop filter in the image decoding apparatus have similar functions, and thus description of the loop filter in the image decoding apparatus will be omitted in the following embodiments and modifications.

Modification 1

Figure 10:
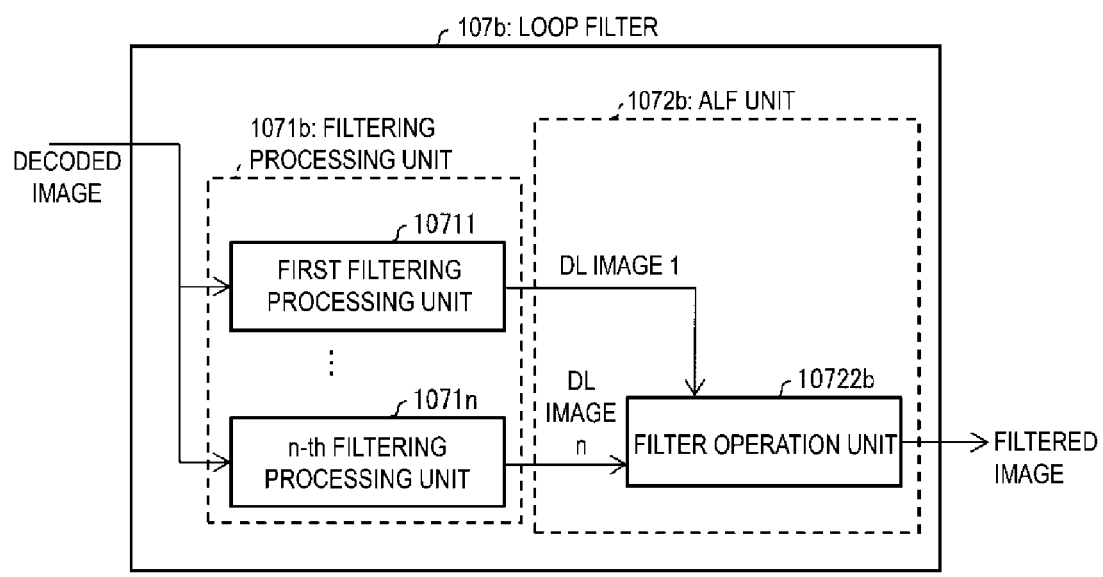
FIG. 10 is a schematic diagram illustrating a configuration of a loop filter of the image filtering apparatus according to Modification 1 of the first embodiment.

A detailed configuration of a loop filter 107b according to the present modification will be described. FIG. 10 is a schematic diagram illustrating a configuration of the loop filter 107b of the image filtering apparatus according to the present modification. In the present modification, the loop filter 107b includes a filtering processing unit 1071b and an ALF unit 1072b.

The filtering processing unit 1071b includes n filtering processing units (multiple filtering processing units) including a first filtering processing unit 10711 to an n-th filtering processing unit 1071n. Each of the first filtering processing unit 10711 to the n-th filtering processing unit 1071n applies a different DNN filter. For example, the first filtering processing unit 10711 may apply a filter appropriate for an image of a natural scenery, the second filtering processing unit 10712 may apply a filter appropriate for an animation image, and the like. Each of the first filtering processing unit 10711 to the n-th filtering processing unit 1071n receives input of a decoded image. Further, the first filtering processing unit 10711 to the n-th filtering processing unit 1071n respectively output a DL image 1 to a DL image n, each of which is filtered with the DNN filter.

The ALF unit 1072b applies a filter by referring the DL image 1 to the DL image n, and outputs a filtered image.

In this manner, in the loop filter 107b, the DL image 1 to the DL image n filtered with different DNN filters are referred to, and the filtered image is output. Accordingly, the loop filter 107b can perform a filter appropriate for an input decoded image. As a result, image quality of the filtered image can be enhanced. According to this configuration, by using images filtered with multiple DNN filters learned using different pieces of learning data (for example, a DNN filter learned using an animation image and a DNN filter learned using a natural image) for the ALF unit 1072b, a filter appropriate for each image can be performed.

Modification 2

Figure 11:
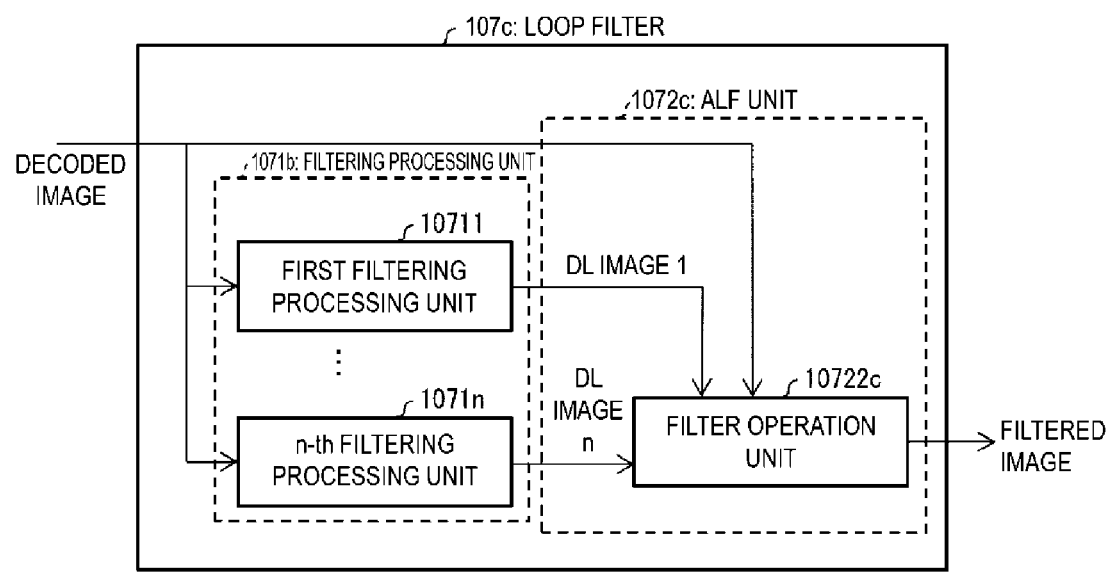
FIG. 11 is a schematic diagram illustrating a configuration of a loop filter of the image filtering apparatus according to Modification 2 of the first embodiment.

A detailed configuration of a loop filter 107c according to the present modification will be described. FIG. 11 is a schematic diagram illustrating a configuration of the loop filter 107c of the image filtering apparatus according to the present modification. In the present modification, the loop filter 107c includes the filtering processing unit 1071b described above and an ALF unit 1072c.

In addition to the configuration of the ALF unit 1072b described above, the ALF unit 1072c further refers to a decoded image being input of the loop filter 107c, and outputs a filtered image.

In this manner, in the loop filter 107c, the decoded image as well as the DL image 1 to the DL image n filtered with different DNN filters is referred to, and the filtered image is output. Accordingly, the loop filter 107c further compensates for intensity of the filters for the images filtered with the DNN filters appropriate for the decoded image. As a result, image quality of the filtered image can be enhanced.

The present configuration is obtained by combining both the configurations of the basic configuration and the configuration of Modification 1. Thus, filtering processing having higher flexibility for various images and having higher image quality can be implemented.

Filter Operation in Case that Multiple Images are Input

Figure 14:
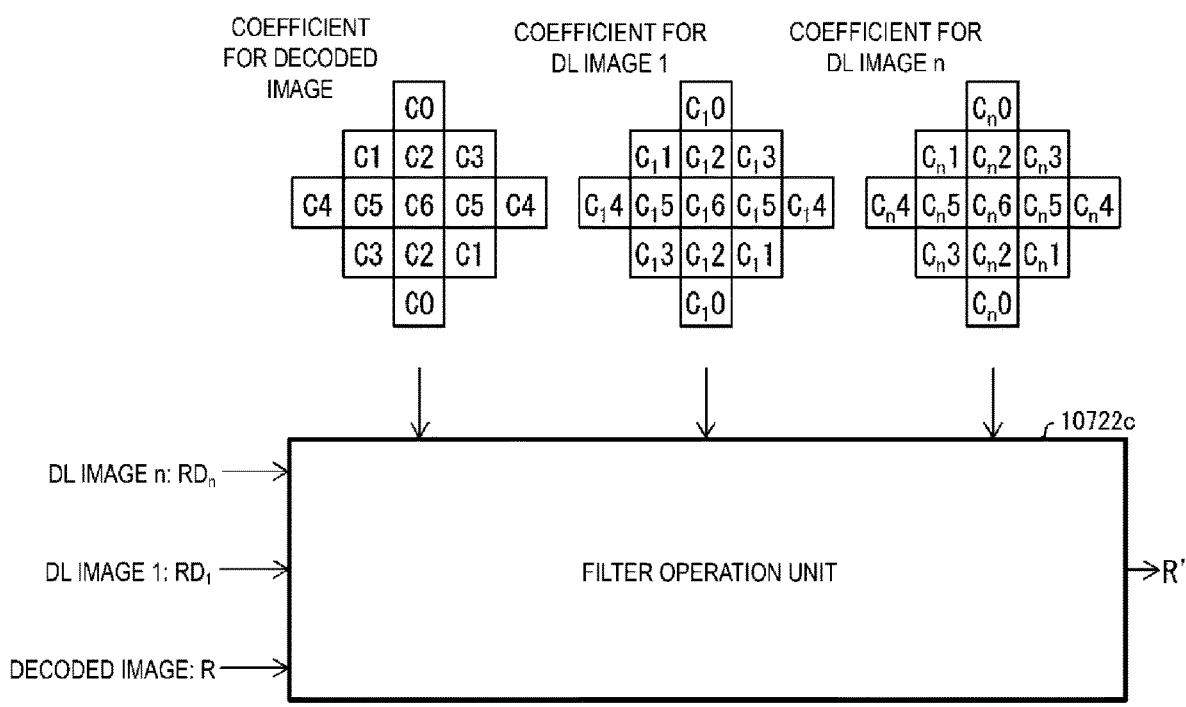
FIG. 14 is a diagram illustrating a filter to be applied by a filter operation unit of the image filtering apparatus by referring to multiple images according to Modification 2 of the first embodiment.

Processing of the filter operation unit 10722c in a case that multiple images are input will be described with reference to FIG. 14. FIG. 14 is a diagram illustrating a filter to be applied by the filter operation unit 10722c of the image filtering apparatus by referring to multiple images according to Modification 2. As illustrated in FIG. 14, the filter operation unit 10722c receives input of a decoded image and DL image 1 to DL image n. Here, a pixel value of the decoded image is represented by R, a pixel value of the DL image 1 is represented by $RD_1$, and a pixel value of the DL image n is represented by $RD_n$, and further, as illustrated in FIG. 14, filter coefficients for the decoded image are represented by C0 to C6, filter coefficients for the DL image 1 are represented by $C_10$ to $C_16$, and filter coefficients for the DL image n are represented by $C_n0$ to $C_n6$. In this case, a pixel value R' of the output filtered image is calculated according to the following expression (7).

Expression 2

$$R'(i,j) = \sum_{k=-L/2}^{L/2} \sum_{l=-L/2}^{L/2} c(k,l) \times R(i+k,j+l) + \sum_{k=-L/2}^{L/2} \sum_{l=-L/2}^{L/2} c_1(k,l) \times RD_1(i+k,j+i) + \ldots \sum_{k=-L/2}^{L/2} \sum_{l=-L/2}^{L/2} c_n(k,l) \times RD_n(i+k,j+l) + o(i,j) \quad (7)$$

Specifically, in a certain pixel of the decoded image and the DL image 1 to the DL image n, the filter operation unit 10722c calculates a product of a pixel value of the pixel and filter coefficients for each image corresponding to the pixel. Then, the filter operation unit 10722c uses a sum of the calculated products as the pixel value of the certain pixel in the filtered image. Further, the filter operation unit 10722c may calculate the pixel value R' by using an offset o (i, j) as in Expression (7), or may calculate the pixel value R' without using the offset. Further, in a configuration in which the filter coefficients are quantized (multiplied by an integer), the filter operation unit 10722c may perform normalization processing (for example, division using an integer value or a right shift operation) after Expression (7). Specifically, it is appropriate that the filter operation unit 10722c uses an integer value as filter coefficients for an integer operation, and uses a right shift after a product-sum operation to regain original accuracy. Note that, in a case that a shift value is shift, the filter operation unit 10722c may add, for example, a value of 1<<(shift−1) for rounding before the shift.

Note that the present example describes a case that the numbers of filter coefficients for the decoded image, for the DL image 1, . . . , for the DL image n are all the same. However, the filter operation unit 10722c may use different numbers of filter coefficients. Further, the positions of reference pixels as seen from the target pixel for the decoded image, for the DL image 1, . . . , for the DL image n may be different from each other as well.

Modification 3

Figure 12:
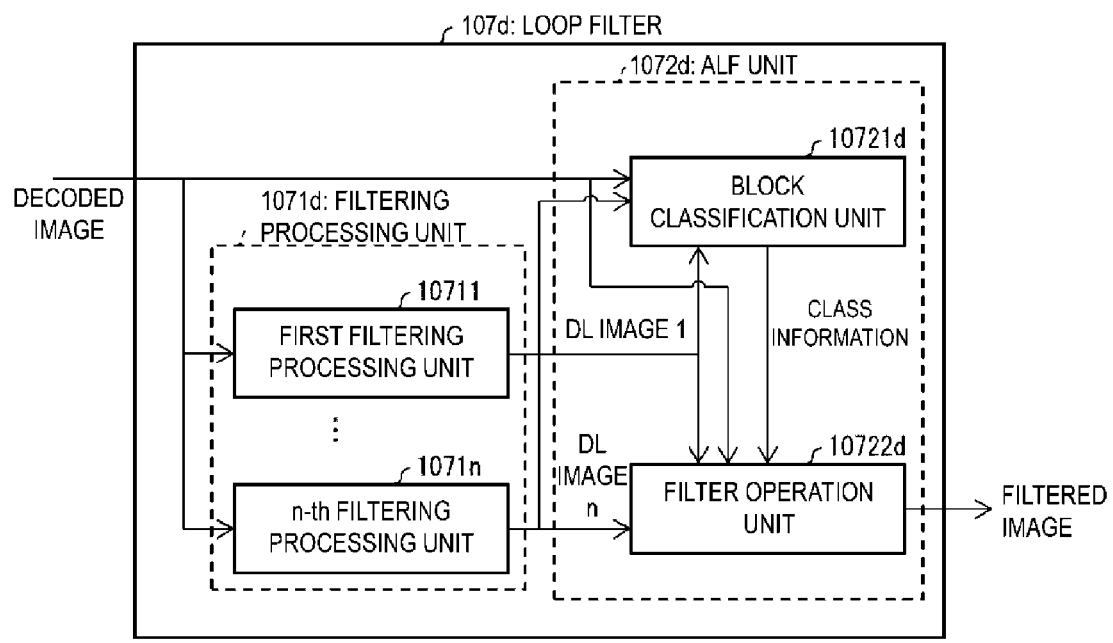
FIG. 12 is a schematic diagram illustrating a configuration of a loop filter of the image filtering apparatus according to Modification 3 of the first embodiment.

A detailed configuration of a loop filter 107d according to the present modification will be described. FIG. 12 is a schematic diagram illustrating a configuration of the loop filter 107d of the image filtering apparatus according to the present modification. In the present modification, the loop filter 107d includes a filtering processing unit 1071d and an ALF unit 1072d.

The filtering processing unit 1071d includes n filtering processing units including the first filtering processing unit 10711 to the n-th filtering processing unit 1071n described above. In the filtering processing unit 1071d, the DL image 1 to the DL image n filtered with the DNN filters by the first filtering processing unit 10711 to the n-th filtering processing unit 1071n are output to a block classification unit 10721d and a filter operation unit 10722d to be described later.

The ALF unit 1072d includes the block classification unit 10721d and the filter operation unit 10722d.

Similarly to the block classification unit 30521 described above, the block classification unit 10721d performs classification into 25 classes for each 2×2 block, and outputs class information indicating the classified classes.

The filter operation unit 10722d refers to the decoded image, the DL image 1 to the DL image n, and the class information, and outputs a filtered image.

In this manner, in the loop filter 107d, the class information as well as the DL image 1 to the DL image n filtered with different DNN filters and the decoded image are referred to, and the filtered image is output. Accordingly, in the loop filter 107d, the filtered image according to each class can be output. As a result, image quality of the filtered image can further be enhanced.

Note that, in a similar manner to the loop filter 107b according to Modification 1, the loop filter 107d need not necessarily refer to the decoded image. This configuration holds true in the following modifications as well.

Modification 4

Figure 13:
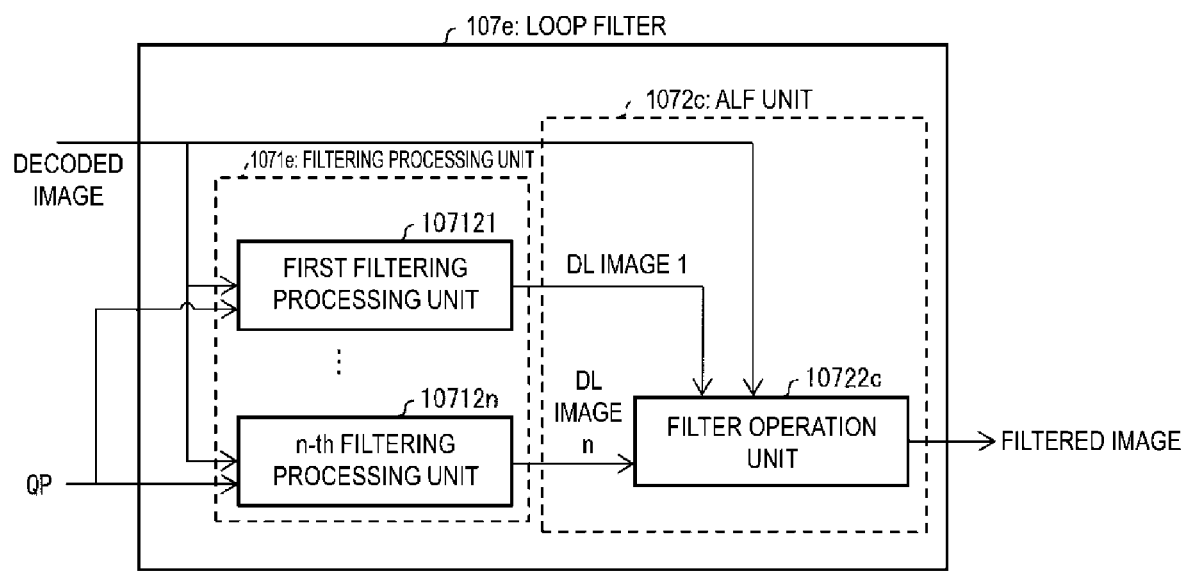
FIG. 13 is a schematic diagram illustrating a configuration of a loop filter of the image filtering apparatus according to Modification 4 of the first embodiment.

A detailed configuration of a loop filter 107e according to the present modification will be described. FIG. 13 is a schematic diagram illustrating a configuration of the loop filter 107e of the image filtering apparatus according to the present modification. In the present modification, the loop filter 107e includes a filtering processing unit 1071e and the ALF unit 1072c described above.

The filtering processing unit 1071e includes a first filtering processing unit 107111 to an n-th filtering processing unit 10711n. Each of the first filtering processing unit 107111 to the n-th filtering processing unit 10711n receives input of a decoded image and a coding parameter (here, QP being a quantization parameter) related to an input image. Here, the quantization parameter refers to a parameter for controlling a compression ratio of an image and image quality, one example of which is a parameter for deriving a quantization step size of a prediction residual. Accordingly, each of the first filtering processing unit 107111 to the n-th filtering processing unit 10711n can apply a filter according to the coding parameter (quantization parameter) as well.

In this manner, the loop filter 107e receives input of the DL image 1 to the DL image n filtered with the filters according to the coding parameter (quantization parameter) related to the input image. The loop filter 107e outputs the filtered image by referring to the DL image 1 to the DL image n. As a result, image quality of the filtered image can further be enhanced. Here, the configuration of using the quantization parameter (coding parameter) as well as the decoded image as the input value can be used in other configurations (for example, Modification 1 to Modification 3, and Modification 5 and its following modifications) as well. Note that the coding parameter is not limited to the quantization parameter. The prediction mode, the motion vector, or the like can be used as the coding parameter as well.

Modification 5

Figure 15:
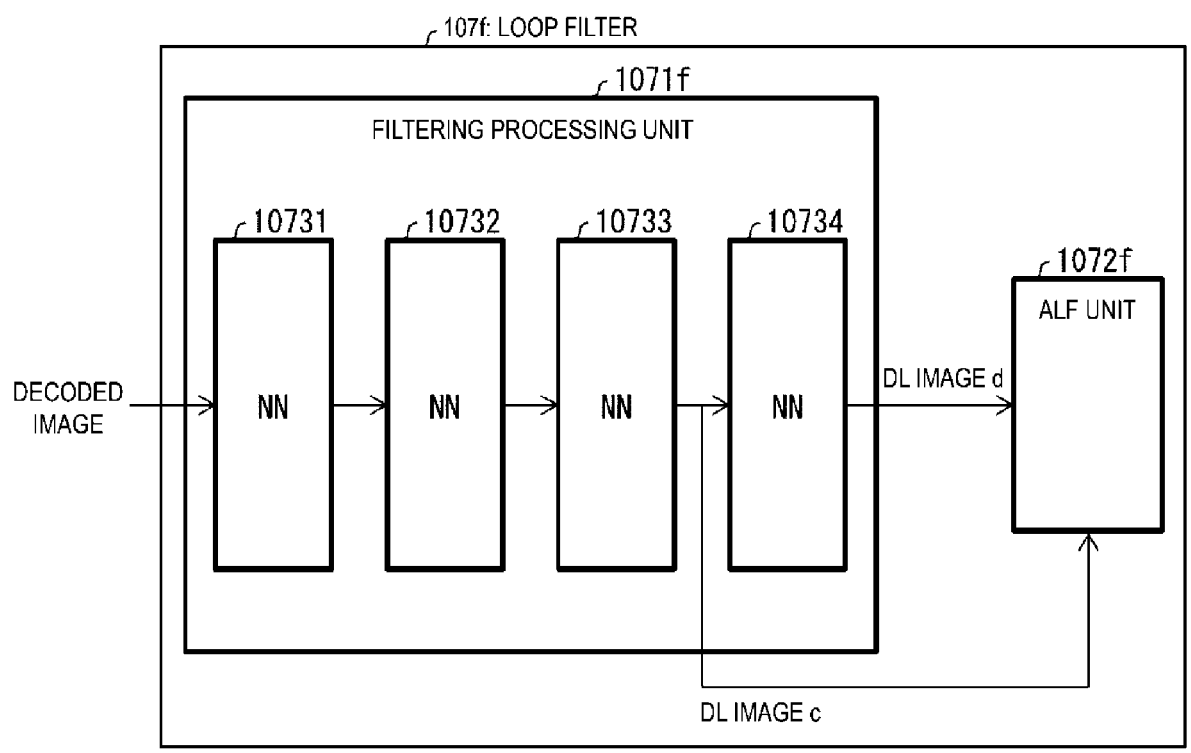
FIG. 15 is a schematic diagram illustrating a configuration of a loop filter of the image filtering apparatus according to Modification 5 of the first embodiment.

A detailed configuration of a loop filter 107f according to the present modification will be described. FIG. 15 is a schematic diagram illustrating a configuration of the loop filter 107f of the image filtering apparatus according to the present modification. In the present modification, the loop filter 107f includes a filtering processing unit 1071f and an ALF unit 1072f.

A neural network included in the filtering processing unit 1071f includes, as illustrated in FIG. 15, multiple layers (in FIG. 15, four layers consisting of an NN 1 (10731), an NN 2 (10732), an NN 3 (10733), and an NN 4 (10734)), in each of which the filter (NN processing) is applied. The layer of each NN processing may include at least any one of the following configurations.

(1) conv (x): Configuration in which processing (convolution) of applying a filter is performed
(2) act (conv (x)): Configuration in which activation (non-linear function, for example, sigmoid, tan h, relu, elu, selu, or the like) is performed after convolution
(3) batch_norm (act (conv (x))): Configuration in which batch normalization (normalization of a range of inputs) is performed after convolution and activation
(4) act (batch_norm (conv (x))): Configuration in which batch normalization (normalization of a range of inputs) is performed between convolution and activation
(5) pooling: Configuration in which compression and downsizing of information are performed between conv layers
(6) add/sub: Configuration in which addition is performed for each element (including a configuration in which subtraction is performed)
(7) concatenate/stack: configuration in which multiple inputs are piled up to configure a new large input
(8) fcn: Configuration in which fully connected filters are applied
(9) lcn: Configuration in which locally connected filters are applied Each NN layer may include multiple processings. Specifically, in each NN layer, multiple cony processings may be performed.

The filtering processing unit 1071f outputs a DL image d filtered with the filters in all of the multiple layers, and one or multiple images filtered with the filters in one or multiple layers out of the multiple layers (in the present modification, a DL image c filtered with the filters in 10731, 10732, and 10733).

The DNN filter such as the filtering processing unit 1071*f* repeats the NN processing in multiple stages, and thereby performs processing from low-level image processing in a layer of a previous stage to high-level image processing in a layer of a subsequent stage. An output image of a layer close to the previous stage is an image that is close to an input image or an image obtained by low-level image processing such as edge determination. In the middle layer, intermediate-level image processing such as object recognition and region classification is performed. Further, as the stage is closer to the final stage, high-level image processing and fine adjustment are performed, and an output image is closer to the final image (here, an image having high image quality). Note that, in such multi-stage filtering processing (NN processing), higher-level information is added as more layers are applied. At the same time, however, lower-level information may be lost in some cases. In this sense, in the filtering processing unit 1071*f*, it can also be said that the output image of a layer close to the previous stage has a greater amount of information related to the input image.

The ALF unit 1072*f* receives input of the DL image c and the DL image d that are output from the filtering processing unit 1071*f*. The ALF unit 1072*f* refers to the input DL image c and DL image d, and outputs a filtered image.

In the ALF unit 1072*f*, by using multiple outputs out of outputs of layers having a multi-stage configuration and thereby combining an image close to an input image, an image obtained by low-level image processing, an image obtained by high-level image processing, and a final image, filtering processing having high flexibility can be implemented.

In this manner, in the loop filter 107*f*, the neural network included in the filtering processing unit 1071*f* includes multiple layers in each of which the filter is applied, and the ALF unit 1072*f* receives input of the DL imaged filtered with the filters in all of the multiple layers, and the image filtered with the filters in multiple layers out of the multiple layers (the DL image c filtered with the filters in 10731, 10732, and 10733). Accordingly, in the loop filter 1072*f*, not only the DL image d but also the DL image c not filtered with the filter in 10734, that is, the DL image c having a greater amount of information than the DL image d, is referred to. As a result, image quality of the filtered image can further be enhanced.

Note that, in a similar manner to the loop filter 107*c* according to Modification 2, the loop filter 107*f* may refer to the decoded image as well. This configuration holds true in the following modifications as well.

Modification 6

Figure 16:
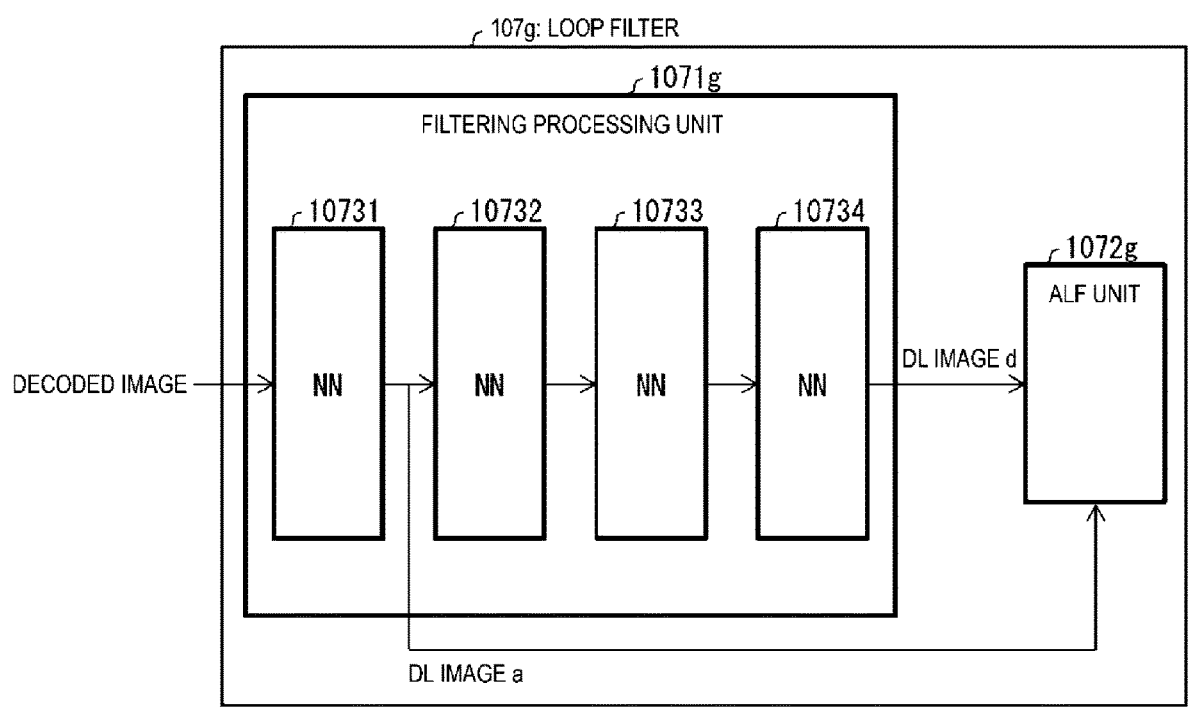
FIG. 16 is a schematic diagram illustrating a configuration of a loop filter of the image filtering apparatus according to Modification 6 of the first embodiment.

A detailed configuration of a loop filter 107*g* according to the present modification will be described. FIG. 16 is a schematic diagram illustrating a configuration of the loop filter 107*g* of the image filtering apparatus according to the present modification. In the present modification, the loop filter 107*g* includes a filtering processing unit 1071*g* and an ALF unit 1072*g*.

The filtering processing unit 1071*g* outputs a DL image d filtered with the filters in all of the multiple layers, and one or multiple images filtered with the filters in one or multiple layers out of the multiple layers (in the present modification, a DL image a filtered with the filter in 10731).

The ALF unit 1072*g* receives input of the DL image a and the DL image d that are output from the filtering processing unit 1071*g*. The ALF unit 1072*g* refers to the input DL image a and DL image d, and outputs a filtered image.

In this manner, the ALF unit 1072*g* according to Modification 6 uses an output image (DL image a) of a layer close to the input image than the DL image c according to Modification 5. In this manner, the ALF unit may use output (DL image a) of a layer close to the previous stage of the DNN filters having a multi-stage configuration, or may use output (DL image c) of a layer of the subsequent stage. Although not illustrated, the ALF unit may use both of the DL image a and the DL image c. Further, as will be illustrated in Modification 7 to be described later, the ALF unit may use all of the DL image a, a DL image b, the DL image c, and the DL image d.

In this manner, in the loop filter 107*g*, the ALF unit 1072*g* receives input of the DL image d, and the DL image a filtered with the filter in a single layer (10731) out of the multiple layers. Accordingly, in the loop filter 1072*g*, the ALF unit 1072*g* refers to not only the DL image d but also the DL image a having a greater amount of information than the DL image d. As a result, image quality of the filtered image can further be enhanced.

Modification 7

Figure 17:
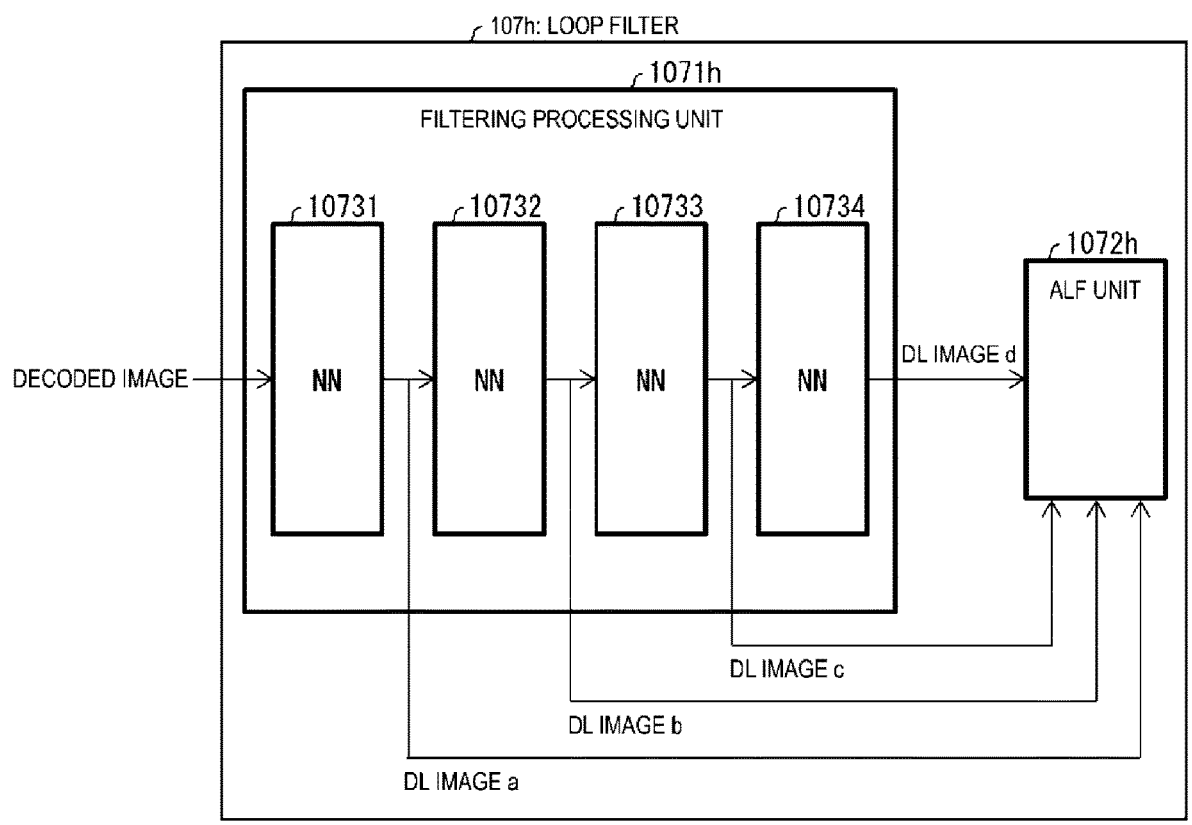
FIG. 17 is a schematic diagram illustrating a configuration of a loop filter of the image filtering apparatus according to Modification 7 of the first embodiment.

A detailed configuration of the loop filter 107*h* according to the present modification will be described. FIG. 17 is a schematic diagram illustrating a configuration of the loop filter 107*h* of the image filtering apparatus according to the present modification. In the present modification, the loop filter 107*h* includes a filtering processing unit 1071*h* and an ALF unit 1072*h*.

The filtering processing unit 1071*h* outputs a DL image d filtered with the filters in all of the multiple layers, a DL image a filtered with the filter in 10731, a DL image b filtered with the filters in 10731 and 10732, and a DL image c filtered with the filters in 10731, 10732, and 10733.

The ALF unit 1072*h* receives input of the DL image a to the DL image d that are output from the filtering processing unit 1071*h*. The ALF unit 1072*h* refers to the input DL image a to DL image d, and outputs a filtered image.

In this manner, in the loop filter 107*h*, the ALF unit 1072*h* receives input of the DL image d, and the multiple DL image a to DL image c filtered with the filters in one or multiple layers out of the multiple layers. Accordingly, in the loop filter 1072*h*, multiple images each having a different amount of information are referred to. As a result, image quality of the filtered image can further be enhanced.

As described above, the image filtering apparatus according to the present embodiment is an image filtering apparatus for performing operation on an input image. The image filtering apparatus includes: one or multiple filtering processing units 1071 (the filtering processing unit 1071*b* to the filtering processing unit h, the first filtering processing unit 10711 to the n-th filtering processing unit 1071*n*) each including a neural network configured to apply a filter to the input image (decoded image); and an ALF unit 1072 (the ALF unit 1072*a* to the ALF unit 1072*h*) configured to receive input of an image (the DL image, the DL image d) to which a filter is applied by a first filtering processing unit out of the one or multiple filtering processing units. The ALF unit 1072 further receives input of at least any one of the input image and an image (the DL image n, the DL image a to the DL image c) to which a filter is applied by a second filtering processing unit different from the first filtering processing unit out of the one or multiple filtering processing units. According to this configuration, the image filtering apparatus according to the present embodiment can enhance image quality of the filtered image.

Second Embodiment

Figure 18:
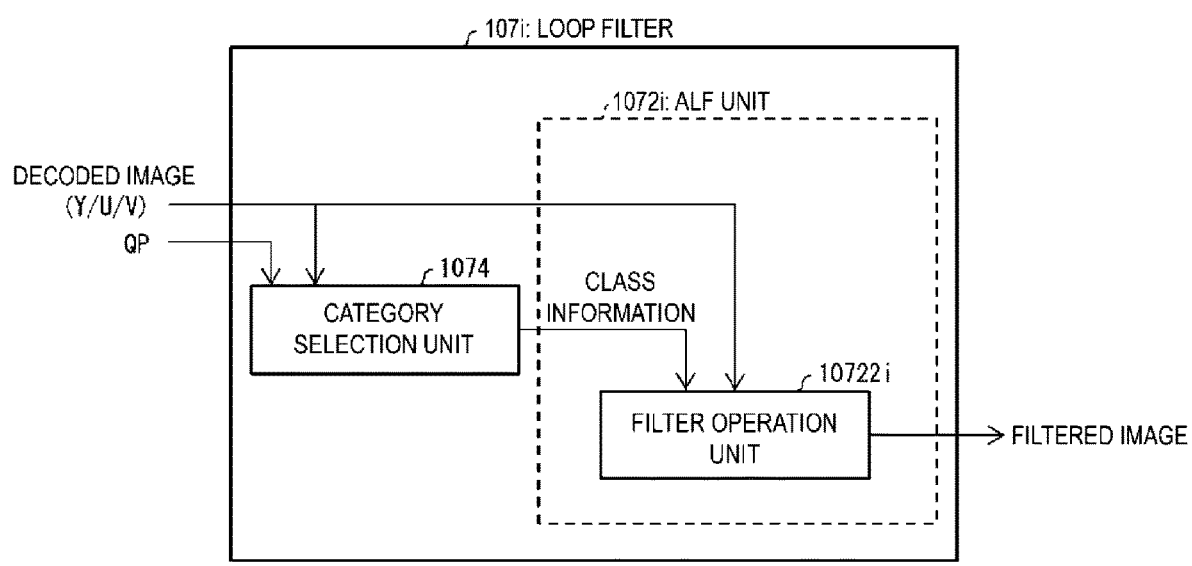
FIG. 18 is a schematic diagram illustrating a configuration of a loop filter of the image filtering apparatus according to a second embodiment.

A detailed configuration of a loop filter 107i according to the present embodiment will be described. FIG. 18 is a schematic diagram illustrating a configuration of the loop filter 107i of the image filtering apparatus according to the present embodiment. In the present embodiment, the loop filter 107i includes a category selection unit 1074 (class selection unit) and an ALF unit 1072i (filter unit).

The category selection unit 1074 receives a decoded image (Y/U/V) and a quantization parameter QP. The category selection unit 1074 includes a neural network, and the neural network refers to the decoded image and the quantization parameter QP and outputs class information.

Note that, in the present embodiment, luminance is represented by Y and chrominance is represented by U, V. However, L, Cb, Cr may be used instead. Further, as the luminance and the chrominance, luminance and chrominance defined in BT.709, BT.2100, or the like may be used.

The ALF unit 1072i includes a filter operation unit 10722i. The filter operation unit 10722i refers to the decoded image and the class information output from the category selection unit 1074, and outputs a filtered image.

In this manner, the loop filter 107i according to the present embodiment includes the filter operation unit 10722i that performs operation on the decoded image while switching the filter coefficients for each prescribed unit by referring to the class information, and the category selection unit 1074 that generates the class information. Further, the category selection unit 1074 includes a neural network that receives input of the decoded image and the quantization parameter related to the decoded image, and outputs the class information. Accordingly, in the loop filter 107i, the configuration of the ALF unit 1072i can be simplified.

Modification 8

Figure 19:
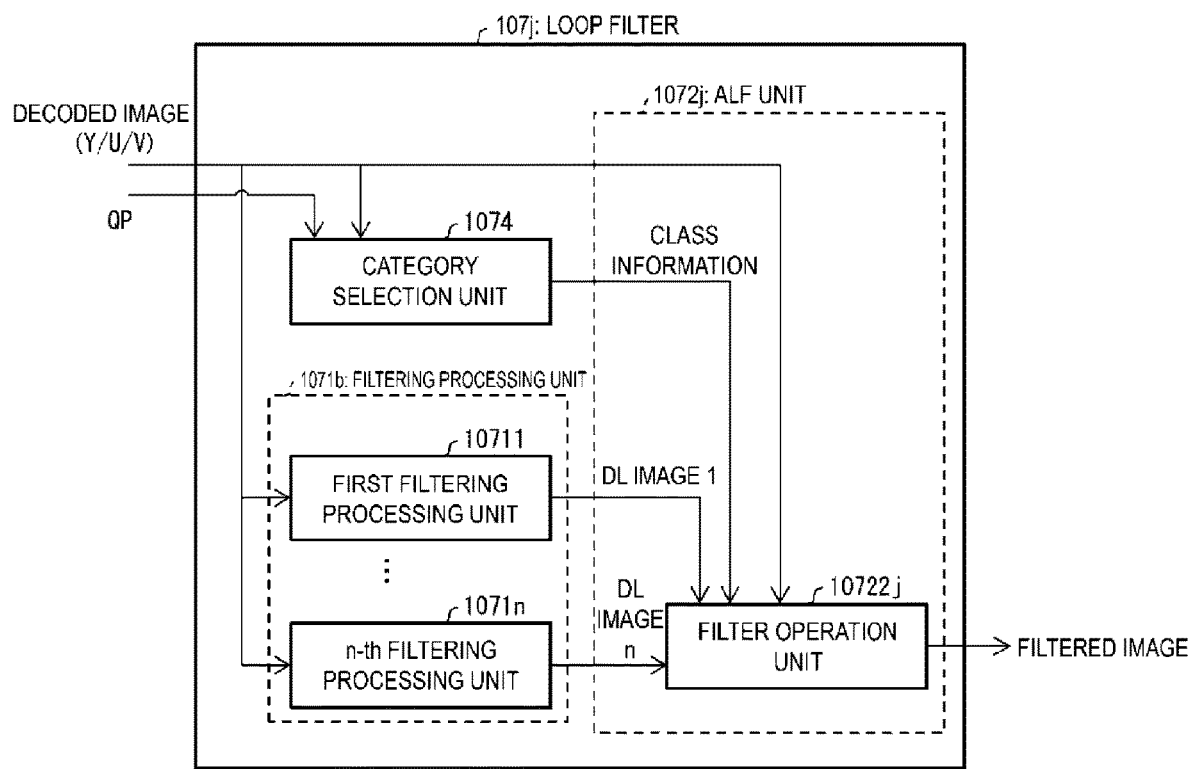
FIG. 19 is a schematic diagram illustrating a configuration of a loop filter of the image filtering apparatus according to Modification 8 of the second embodiment.

A detailed configuration of a loop filter 107j according to the present modification will be described. FIG. 19 is a schematic diagram illustrating a configuration of the loop filter 107j of the image filtering apparatus according to the present modification. In the present modification, the loop filter 107j includes an ALF unit 1072j in addition to the category selection unit 1074 and the filtering processing unit 1071b described above.

The ALF unit 1072j includes a filter operation unit 10722j. The filter operation unit 10722j refers to the DL image 1 to the DL image n output from the filtering processing unit 1071b and the class information output from the category selection unit 1074, and outputs a filtered image.

In this manner, the loop filter 107j according to the present modification further includes one or multiple filtering processing units 1071b including a neural network that applies a filter to the decoded image, and the filter operation unit 10722j further receives input of the DL image 1 to the DL image n filtered with the filter by the filtering processing unit 1071b. Accordingly, in the loop filter 107j, in the ALF unit 1072j having a simplified configuration, image quality of the filtered image can be enhanced.

Modification 9

Figure 20:
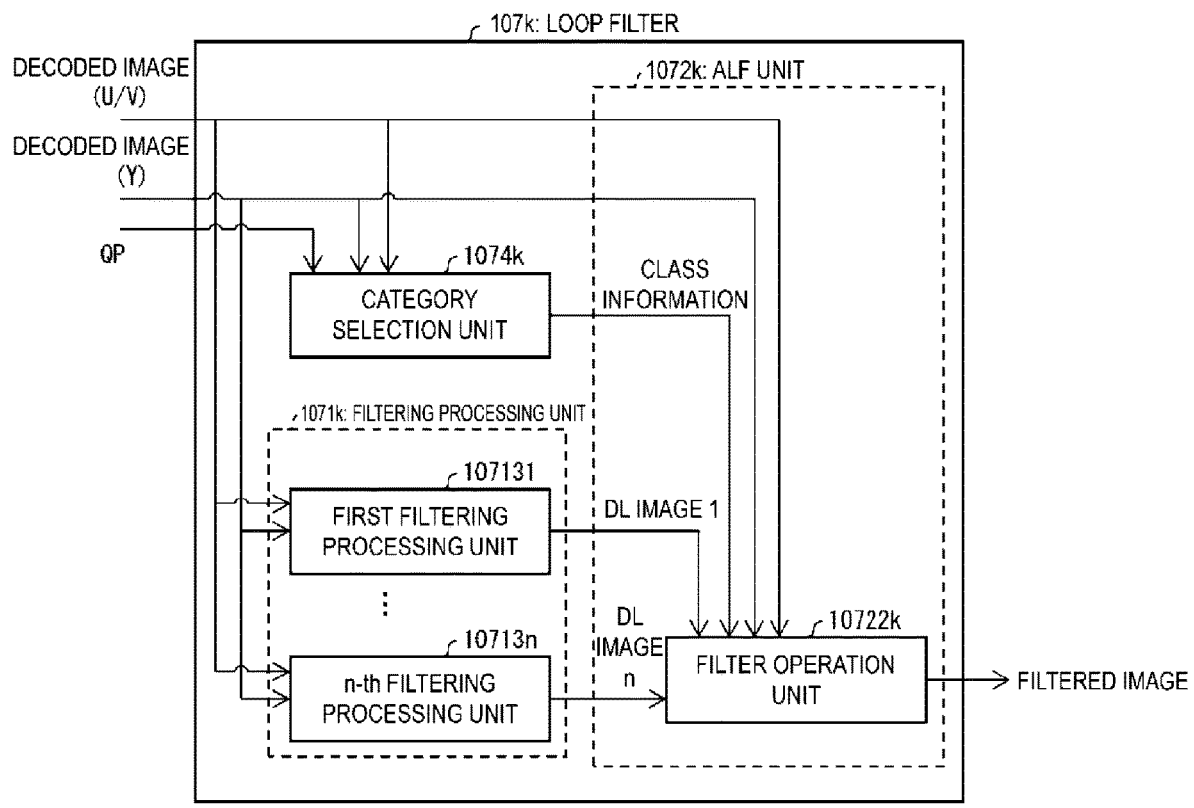
FIG. 20 is a schematic diagram illustrating a configuration of a loop filter of the image filtering apparatus according to Modification 9 of the second embodiment.

A detailed configuration of a loop filter 107k according to the present modification will be described. FIG. 20 is a schematic diagram illustrating a configuration of the loop filter 107k of the image filtering apparatus according to the present modification. In the present modification, the loop filter 107k includes a category selection unit 1074k, a filtering processing unit 1071k, and an ALF unit 1072k.

The loop filter 107k receives input of luminance (Y) being information indicating luminance and chrominance (U/V) being information indicating a color of a decoded image through different channels. Accordingly, each unit included in the loop filter 107k also receives input of the luminance (Y) and the chrominance (U/V) of the decoded image are through different channels.

The category selection unit 1074k refers to the luminance (Y) and the chrominance (U/V) of the decoded image and a quantization parameter QP, and generates class information.

As illustrated in FIG. 20, the filtering processing unit 1071k includes a first filtering processing unit 107131 to an n-th filtering processing unit 10713n. The first filtering processing unit 107131 to the n-th filtering processing unit 10713n respectively output a DL image 1 to a DL image n filtered with a filter for each of the luminance (Y) and the chrominance (U/V).

A filter operation unit 10722k refers to the luminance (Y) and the chrominance (U/V) of the decoded image, the class information output from the category selection unit 1074k, and the DL image 1 to the DL image n output from the filtering processing unit 1071k, and outputs a filtered image.

In this manner, the loop filter 107k receives input of the luminance (Y) and the chrominance (U/V) of the decoded image through different channels. In the related art, resolutions of the luminance (Y) and the chrominance (U/V) are different. Thus, in a case that the luminance (Y) and the chrominance (U/V) are interleaved, a higher resolution of the chrominance (U/V) is needed in accordance with the luminance (Y), which increases the amount of computation. In contrast, in the loop filter 107k, the luminance (Y) and the chrominance (U/V) are separate from each other, and in addition, (U) and (V) of the chrominance are the same resolution. Thus, the amount of computation is reduced in interleaving. Further, the loop filter 107k can perform processing for the luminance (Y) and processing for the chrominance (U/V) in parallel. As a result, efficiency is enhanced. Further, in the loop filter 107k, the amount of information is increased due to the capability of, for example, processing using information of both of U and V in the chrominance processing. As a result, accuracy is enhanced as well.

Third Embodiment

Figure 21:
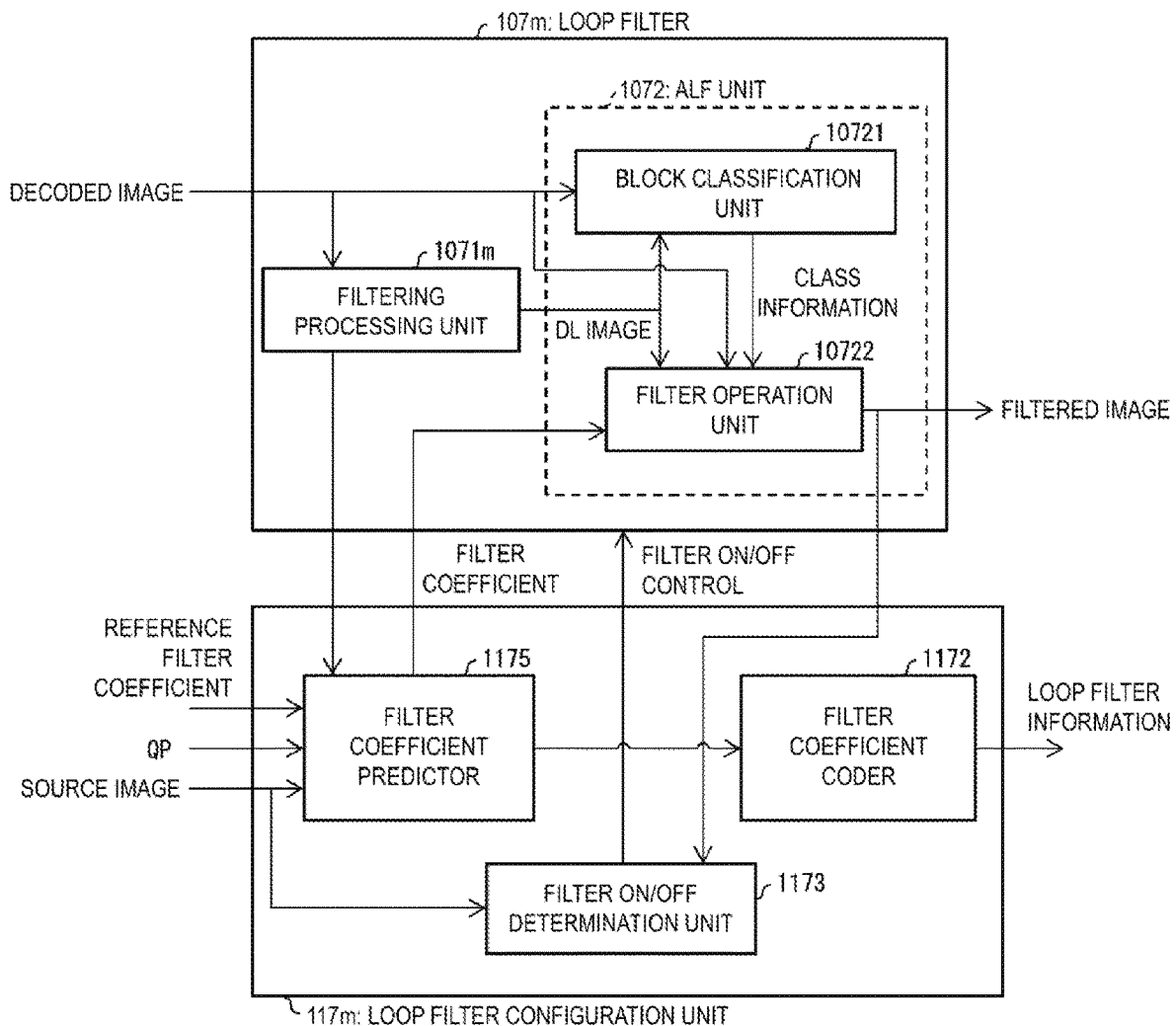
FIG. 21 is a schematic diagram illustrating a configuration of a loop filter and a loop filter configuration unit of the image filtering apparatus according to a third embodiment.

A detailed configuration of the image filtering apparatus according to the present embodiment will be described. FIG. 21 is a schematic diagram illustrating a configuration of a loop filter 107m and a loop filter configuration unit 117m of the image filtering apparatus according to the present embodiment.

The loop filter 107m includes a filtering processing unit 1071m and the ALF unit 1072 described above.

The filtering processing unit 1071m receives input of a decoded image, and outputs a DL image filtered with the DNN filter to the filter operation unit 10722 and the loop filter configuration unit 117m.

The loop filter configuration unit 117m includes a filter coefficient predictor 1175 in addition to the filter coefficient coder 1172 and the filter ON/OFF determination unit 1173 described above.

The filter coefficient predictor 1175 includes a neural network that receives input of reference filter coefficients to be described later, a source image (input image) or a DL image (an image related to the input image), and a quantization parameter QP of the source image or the DL image, and that outputs filter coefficients to be directly used in the filter operation unit 10722.

Reference Filter Coefficient

The reference filter coefficients refer to coefficients that serve as a reference used in a case that the filter coefficient predictor 1175 generates filter coefficients. For example, filter coefficients generated by using a prescribed number of images may be used as the reference filter coefficients. The reference filter coefficients calculated in the above-mentioned configuration are not necessarily relevant to characteristics of the input quantization parameter QP, source image, or DL image. For this reason, filter coefficients need to be generated in the neural network of the filter coefficient predictor 1175. In the neural network, the filter coefficients are generated by referring to the reference filter coefficients serving as a reference. As a result, processing can be simplified.

Further, in another example, the reference filter coefficients may be generated in advance for each input image, and the filter coefficient predictor 1175 may use the reference filter coefficients, the quantization parameter QP of a prescribed unit (for example, a block unit), and the input image to generate the filter coefficients with the use of a neural network that is relevant to the characteristics of the prescribed unit. In this configuration, the filter coefficients are generated by using a neural network that is relevant to the characteristics of the block unit. As a result, more appropriate filter coefficients can be used.

Loop Filter 305m

Figure 23:
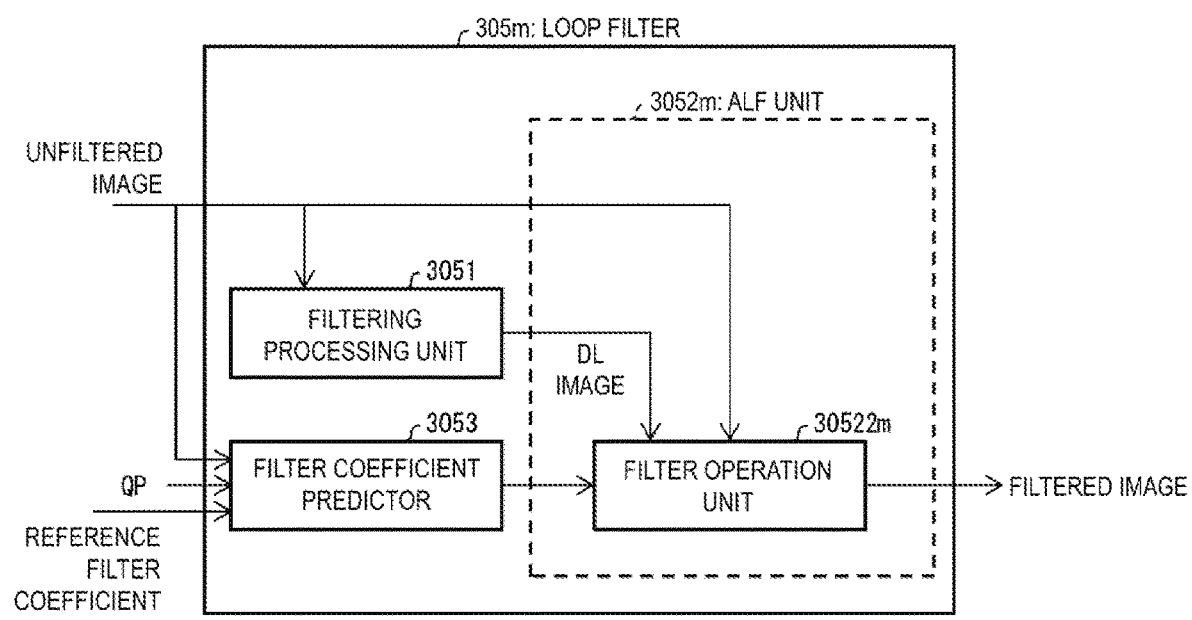
FIG. 23 is a schematic diagram illustrating a configuration of a loop filter of the image filtering apparatus according to the third embodiment.

A detailed configuration of the loop filter 305m used in the image decoding apparatus according to the present embodiment will be described. FIG. 23 is a schematic diagram illustrating a configuration of the loop filter 305m of the image filtering apparatus according to the present embodiment. The loop filter 305m includes the filtering processing unit 3051 described above, an ALF unit 3052m (filter unit), and a filter coefficient predictor 3053.

The ALF unit 3052m includes a filter operation unit 30522m. The filter operation unit 30522m receives input of an unfiltered image, a DL image output from the filtering processing unit 3051, and filter coefficients output from the filter coefficient predictor 3053, and outputs a filtered image.

The filter coefficient predictor 3053 includes a neural network that receives input of the unfiltered image, the quantization parameter QP of the unfiltered image, and the reference filter coefficients, and that output filter coefficients.

In this manner, the image filtering apparatus according to the present embodiment includes the loop filter 107m (loop filter 305m) that performs operation on an input image, and the filter coefficient predictor 1175 (filter coefficient predictor 3053) that generates filter coefficients to be directly used by the loop filter 107m. The filter coefficient predictor 1175 includes a neural network that outputs the filter coefficients. Accordingly, in the image filtering apparatus, the neural network generates the filter coefficient. As a result, the configuration can be simplified.

Modification 10

Figure 22:
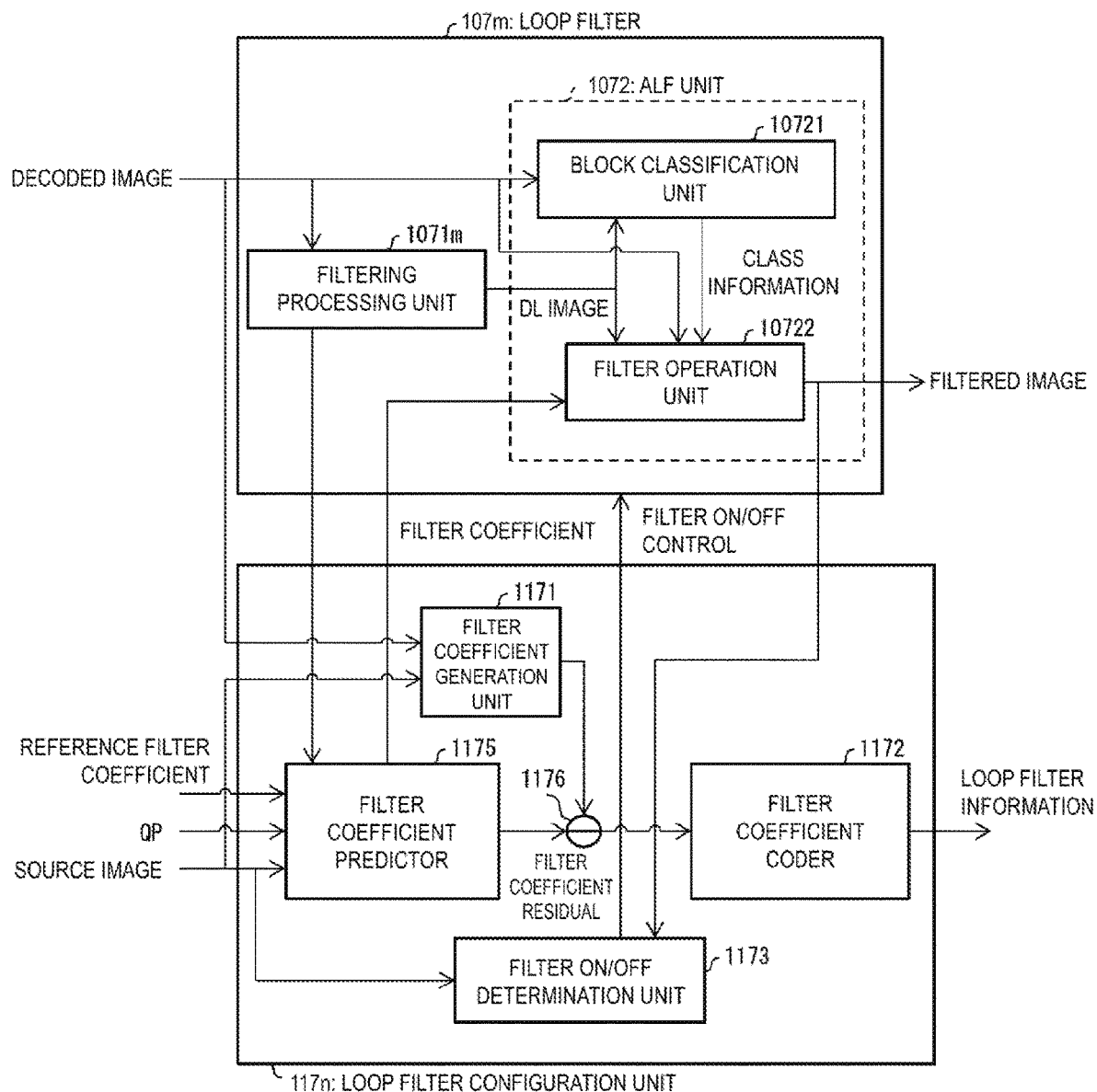
FIG. 22 is a schematic diagram illustrating a configuration of a loop filter and a loop filter configuration unit of the image filtering apparatus according to Modification 10 of the third embodiment.

A detailed configuration of a loop filter configuration unit 117n according to the present modification will be described. FIG. 22 is a schematic diagram illustrating a configuration of the loop filter 107m and the loop filter configuration unit 117n of the image filtering apparatus according to the present modification. Note that the loop filter 107m has been described in the above, and description thereof is herein omitted.

The loop filter configuration unit 117n includes a subtraction unit 1176 in addition to the filter coefficient generation unit 1171, the filter coefficient coder 1172, the filter ON/OFF determination unit 1173, and the filter coefficient predictor 1175 described above.

The subtraction unit 1176 outputs filter coefficient residuals obtained by subtracting the filter coefficients generated by the filter coefficient generation unit 1171 and a prediction value of the filter coefficients generated by filter coefficient predictor 1175. In other words, in the present modification, the prediction value of the filter coefficients generated by the filter coefficient predictor 1175 corresponds to filter coefficients to be used indirectly.

Loop Filter 305n

Figure 24:
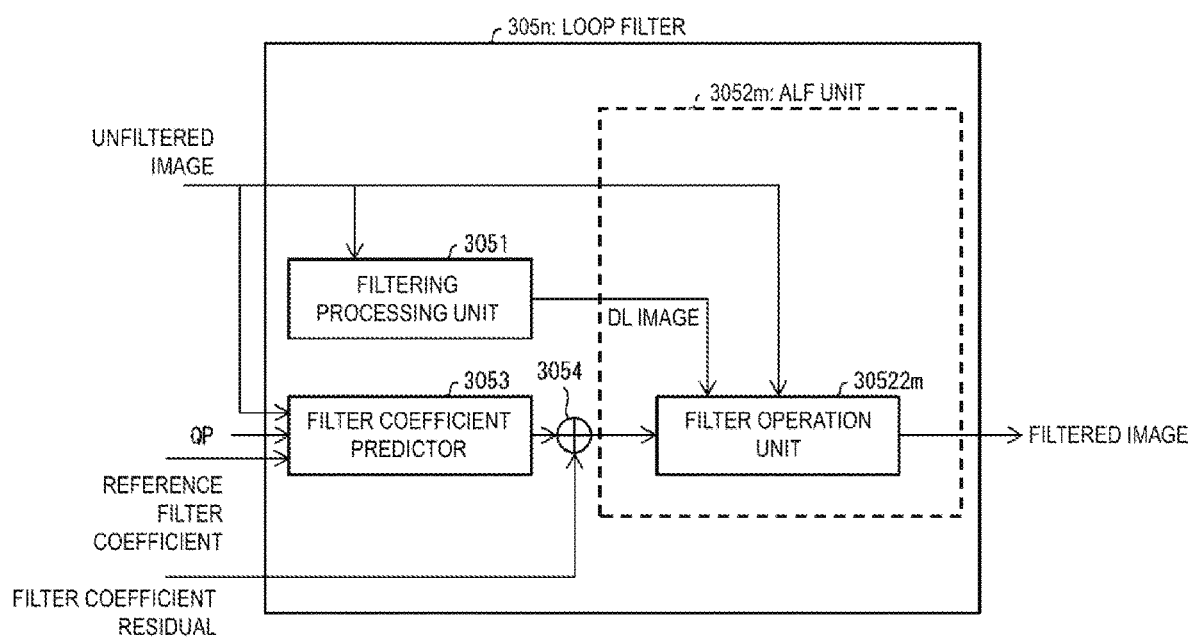
FIG. 24 is a schematic diagram illustrating a configuration of a loop filter of the image filtering apparatus according to Modification 10 of the third embodiment.

A detailed configuration of the loop filter 305n used in the image decoding apparatus according to the present modification will be described. FIG. 24 is a schematic diagram illustrating a configuration of the loop filter 305n of the image filtering apparatus according to the present modification. The loop filter 305n includes an addition unit 3054 in addition to the filtering processing unit 3051, the ALF unit 3052m, and the filter coefficient predictor 3053 described above.

The addition unit 3054 adds the filter coefficients generated by the filter coefficient predictor 3053 and the filter coefficient residuals generated by the image coding apparatus, and outputs filter coefficients.

In this manner, the image filtering apparatus according to the present modification includes the loop filter 107n (loop filter 305n) that performs operation on an input image, and the filter coefficient predictor 1175 (filter coefficient predictor 3053) that generates a prediction value of the filter coefficients to be indirectly used by the loop filter 107n. The filter coefficient predictor 1175 includes a neural network that outputs the filter coefficients. Accordingly, in the image filtering apparatus, the filter coefficient residuals are coded instead of directly coding generated filter coefficients. As a result, coding efficiency can be enhanced.

Further, in the image filtering apparatus according to the present modification, the filter coefficients to be used directly and the prediction value of the filter coefficients to be used indirectly may be used separately.

For example, in the intra prediction image, the filter coefficients to be used directly may be generated, and in the inter prediction image, the filter coefficient predictor 1175 may generate the prediction value of the filter coefficients to be used indirectly, so as to code the filter coefficient residuals. Further, the filter coefficients to be used directly may be the filter coefficients generated in the filter coefficient generation unit 1171. In other words, each of the filter coefficient generation unit 1171 and the filter coefficient predictor 1175 has a function as the filter coefficient generation unit.

Note that, some of the image coding apparatus 11 and the image decoding apparatus 31 in the above-described embodiments, for example, the entropy decoder 301, the prediction parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, the prediction parameter coder 111, and the loop filter configuration unit 117, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the image coding apparatus 11 or the image decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiments and various amendments can be made to a design that fall within the scope that does not depart from the gist of the disclosure.

Application Examples

The above-mentioned image coding apparatus 11 and the image decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

First, referring to FIG. 25, it will be described that the above-mentioned image coding apparatus 11 and the image decoding apparatus 31 can be utilized for transmission and reception of videos.

Figure 25:
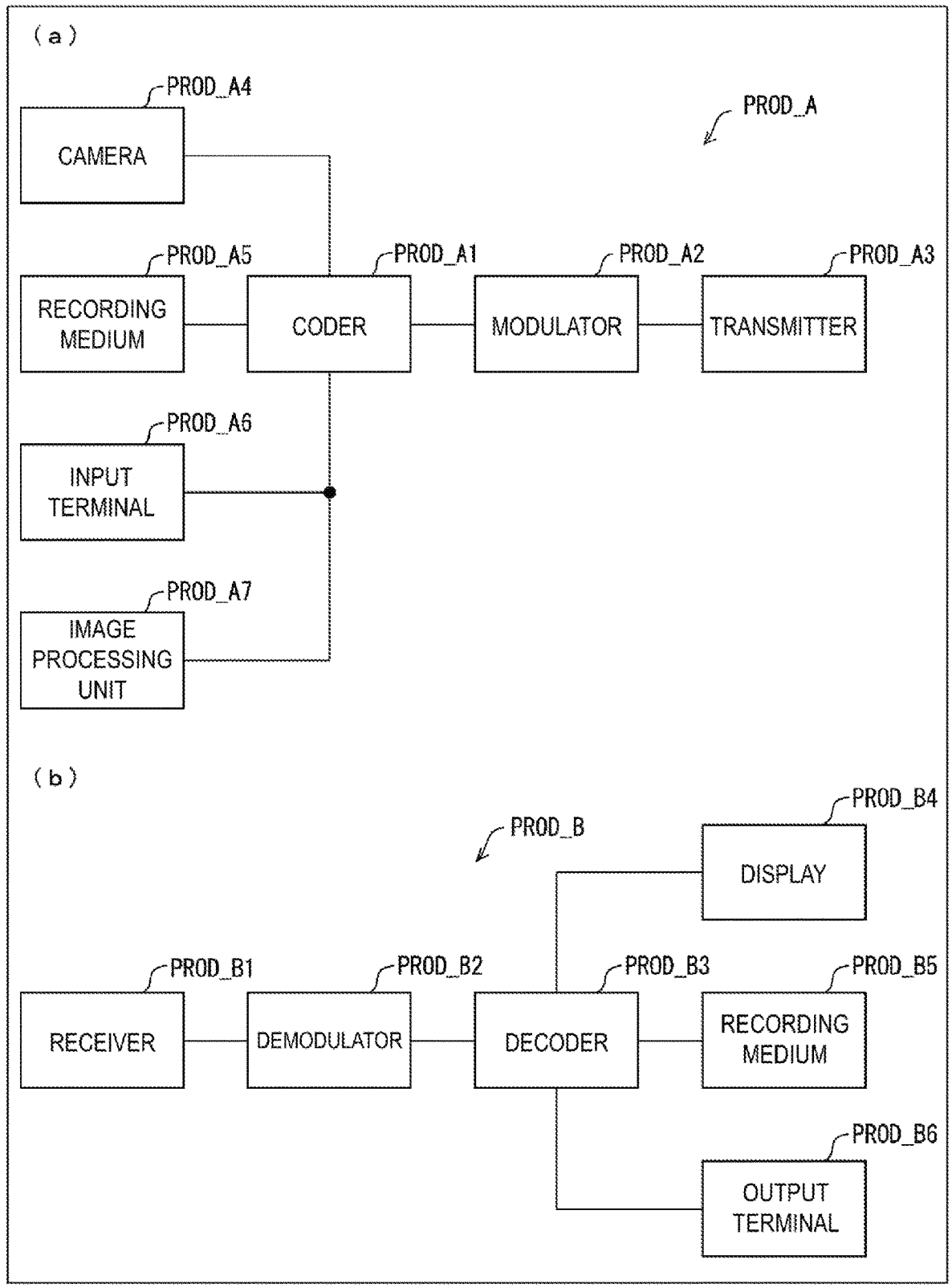
FIG. 25 is a diagram illustrating configurations of a transmitting apparatus equipped with the image coding apparatus and a receiving apparatus equipped with the image decoding apparatus according to the present embodiment. (a) thereof illustrates the transmitting apparatus equipped with the image coding apparatus, and (b) thereof illustrates the receiving apparatus equipped with the image decoding apparatus.

(a) of FIG. 25 is a block diagram illustrating a configuration of a transmitting apparatus PROD_A installed with the image coding apparatus 11. As illustrated in (a) of FIG. 25, the transmitting apparatus PROD_A includes an coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned image coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in (a) of FIG. 25, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

(b) of FIG. 25 is a block diagram illustrating a configuration of a receiving apparatus PROD_B installed with the image decoding apparatus 31. As illustrated in (b) of FIG. 25, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned image decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in (b) of FIG. 25, some of the constituents may be omitted.

Note that the recording medium PROD_B5 may record videos which are not coded, or may record videos which are coded in a coding scheme for recording different from a coding scheme for transmission. In the latter case, an coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 26, it will be described that the above-mentioned image coding apparatus 11 and the image decoding apparatus 31 can be utilized for recording and regeneration of videos.

Figure 26:
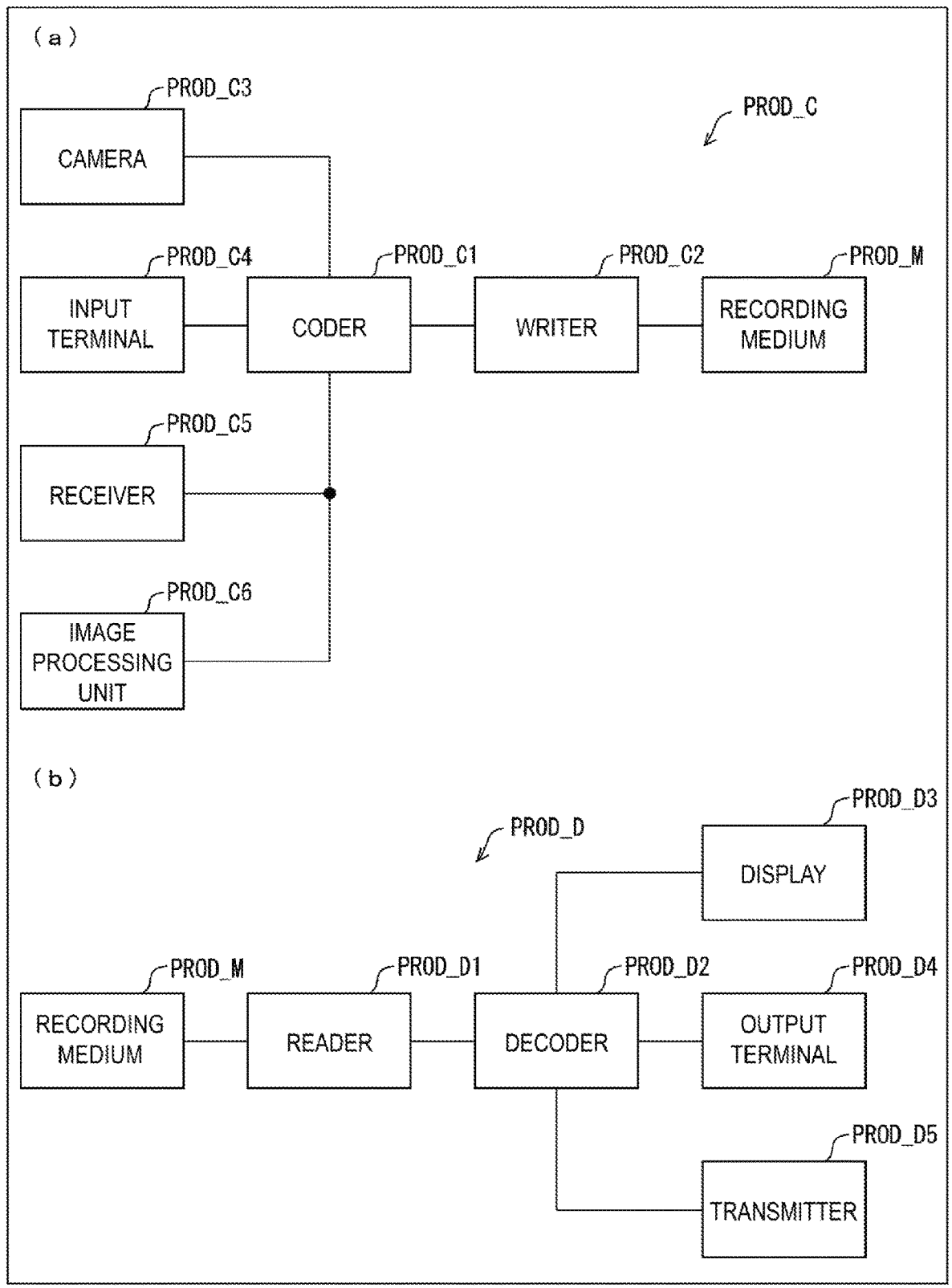
FIG. 26 is a diagram illustrating configurations of a recording apparatus equipped with the image coding apparatus and a reconstruction apparatus equipped with the image decoding apparatus according to the present embodiment. (a) thereof illustrates the recording apparatus equipped with the image coding apparatus, and (b) thereof illustrates the reconstruction apparatus equipped with the image decoding apparatus.

(a) of FIG. 26 is a block diagram illustrating a configuration of a recording apparatus PROD_C installed with the above-mentioned image coding apparatus 11. As illustrated in (a) of FIG. 26, the recording apparatus PROD_C includes an coder PROD_C1 that obtains coded data by coding a video, and a writing unit PROD_C2 that writes the coded data obtained by the coder PROD_C1 in a recording medium PROD_M. The above-mentioned image coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in (a) of FIG. 26, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

(b) of FIG. 26 is a block diagram illustrating a configuration of a reconstruction apparatus PROD_D installed with the above-mentioned image decoding apparatus 31. As illustrated in (b) of FIG. 26, the reconstruction apparatus PROD_D includes a reading unit PROD_D1 which reads coded data written in the recording medium PROD_M, and a decoder PROD_D2 which obtains a video by decoding the coded data read by the reader PROD_D1. The above-mentioned image decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in (b) of FIG. 26, some of the constituents may be omitted.

Note that the transmitter PROD_D5 may transmit a video which is not coded or may transmit coded data coded in the coding scheme for transmission different from a coding scheme for recording. In the latter case, an coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned image decoding apparatus 31 and the image coding apparatus 11 may be realized as a hardware by a logical circuit formed on an integrated circuit (IC chip), or may be realized as a software using a Central Processing Unit (CPU).

In the latter case, each of the above-described apparatuses include a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc(DVD)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/ Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiments of the disclosure can be also realized in the form of computer data signals embedded in a carrier such that the transmission of the program codes is embodied in electronic transmission.

The embodiments of the disclosure are not limited to the above-described embodiments, and various modifications are possible within the scope of the claims. That is, an embodiment obtained by combining technical means modified appropriately within the scope defined by claims is included in the technical scope of the disclosure as well.

Supplement

An image filtering apparatus (loop filter 107 and loop filter configuration unit 117, loop filter 107a to loop filter 107h, loop filter 305) according to aspect 1 of the disclosure is an image filtering apparatus for performing operation on an input image (unfiltered image, decoded image), the image filtering apparatus including: one or multiple filtering processing units (1071, 1071b to 1071h, 3051) each being configured to include a neural network for applying a filter to the input image; and an ALF unit (1072, 1072a to 1072h, 3052) configured to receive input of an image (DL image) to which a filter is applied by a first filtering processing unit out of the one or multiple filtering processing units, wherein the ALF unit further receives input of at least any one of the input image and an image to which a filter is applied by a second filtering processing unit different from the first filtering processing unit out of the one or multiple filtering processing units.

According to the configuration described above, the image filtering apparatus can output a filtered image with enhanced image quality.

In the image filtering apparatus according to aspect 2 of the disclosure, the one or multiple filtering processing units according to aspect 1 may further receive input of a quantization parameter (QP) related to the input image.

According to the configuration described above, the image filtering apparatus can output a filtered image with further enhanced image quality.

In the image filtering apparatus according to aspect 3 of the disclosure, the neural network according to aspect 1 or 2 may include multiple layers (10731, 10732, 10733, 10734) in each of which the filter is applied, and the ALF unit may receive input of an image (DL image d) to which a filter is applied in all of the multiple layers and one or multiple images (DL image a, DL image b, DL image c) to which a filter is applied in one or multiple layers out of the multiple layers.

According to the configuration described above, the image filtering apparatus can output a filtered image with further enhanced image quality.

The image filtering apparatus (loop filter 107i to loop filter 107k) according to aspect 4 of the disclosure includes: a filter unit (ALF unit 1072i to ALF unit 1072k) configured to perform operation on an input image while switching filter coefficients on a prescribed unit basis with reference to class information; and a class selection unit (category selection unit 1074, category selection unit 1074k) configured to generate the class information, wherein the class selection unit includes a neural network that receives input of the input image and a quantization parameter related to the input image and outputs the class information.

According to the configuration described above, the image filtering apparatus can simplify its configuration.

The image filtering apparatus according to aspect 5 of the disclosure includes, in aspect 4, one or multiple filtering processing units (1071b) each being configured to include a neural network for applying a filter to the input image, wherein the filter unit may further receive input of an image to which a filter is applied by the one or multiple filtering processing units.

According to the configuration described above, the image filtering apparatus can output a filtered image with enhanced image quality.

In aspect 4 or 5, in the image filtering apparatus according to aspect 6 of the disclosure, information (Y) indicating luminance and information (U/V) indicating a color of the input image may be input through different channels.

According to the configuration described above, the image filtering apparatus can reduce a computation amount.

The image filtering apparatus (loop filter 107m and loop filter configuration unit 117m or loop filter configuration unit 117n, loop filter 305m, loop filter 305n) according to aspect 7 of the disclosure, includes: a filter unit (ALF unit 1072, filtering processing unit 3051) configured to perform operation on an input image; and a filter coefficient generation unit (1175, 3053, filter coefficient generation unit 1171) configured to generate a filter coefficient to be directly or indirectly used by the filter unit, wherein the filter coefficient generation unit includes a neural network for outputting the filter coefficient.

According to the configuration described above, the image filtering apparatus can simplify its configuration.

In the image filtering apparatus according to aspect 8 of the disclosure, the neural network according to aspect 7 may receive input of: the input image or an image related to the input image; a reference filter coefficient serving as a reference used in a case that the filter coefficient is generated; and a quantization parameter of the input image or the image related to the input image.

According to the configuration described above, the image filtering apparatus can simplify its configuration.

In the image filtering apparatus according to aspect 9 of the disclosure, the filter coefficient generation unit according to aspect 8 may generate, in an image using intra prediction, the filter coefficient to be directly used, and generate, in an image using inter prediction, the filter coefficient to be indirectly used.

According to the configuration described above, the image filtering apparatus can output a filtered image with enhanced image quality.

In the image filtering apparatus according to aspect 10 of the disclosure, the reference filter coefficient according to aspect 8 or 9 may be a filter coefficient generated by using a prescribed number of images.

According to the configuration described above, the image filtering apparatus can simplify its processing.

In the image filtering apparatus according to aspect 11 of the disclosure, the reference filter coefficient according to aspect 8 or 9 may be generated in advance on a per input image basis, and the filter coefficient generation unit may use the reference filter coefficient, the quantization parameter of a prescribed unit, and the input image to generate the filter coefficient with use of the neural network relevant to a characteristic of the prescribed unit.

According to the configuration described above, the image filtering apparatus can output a filtered image with enhanced image quality.

An image decoding apparatus according to aspect 12 of the disclosure includes the image filtering apparatus according to any one of aspects 1 to 11 as a filter to be applied to a decoded image.

According to the configuration described above, the image decoding apparatus that produces an effect similar to that of aspects 1 to 11 can be implemented.

An image coding apparatus according to aspect 13 of the disclosure includes the image filtering apparatus according to any one of claims 1 to 11 as a filter to be applied to an input image.

According to the configuration described above, the image coding apparatus that produces an effect similar to that of aspects 1 to 11 can be implemented.

INDUSTRIAL APPLICABILITY

The embodiments of the disclosure can be preferably applied to an image decoding apparatus that decodes coded data in which image data is coded, and an image coding apparatus that generates coded data in which image data is coded.

CROSS-REFERENCE TO RELATED APPLICATION

This application claims the benefit of priority to JP 2018-057181 filed on Mar. 23, 2018, which is incorporated herein by reference in its entirety.

REFERENCE SIGNS LIST

107 Loop filter
1071 Filtering processing unit
1072 ALF unit
1074 Category selection unit
1171 Filter coefficient generation unit
1175 Filter coefficient predictor
117 Loop filter configuration unit
305 Loop filter
3051 Filtering processing unit
3052 ALF unit
3053 Filter coefficient predictor

The invention claimed is:

1. An image filtering apparatus for filtering an input image, the image filtering apparatus comprising:
   a loop filter that includes (i) at least a first neural network filter and a second neural network filter, and (ii) an adaptive loop filter,
   wherein:
   the first neural network filter receives (i) the input image and (ii) an image of a quantization parameter which is defined by an array of two dimensions, and outputs a first output image,
   the second neural network filter receives the input image or the first output image, and outputs a second output image, and
   the adaptive loop filter receives (i) the input image, (ii) the first output image, and (iii) the second output image, and outputs a filtered image, as a third output image.

2. The image filtering apparatus according to claim 1, wherein:
   a neural network includes a plurality of layers in each of which filters applied, and
   the adaptive loop filter receives (i) the first output image in which the filters are applied in all of the plurality of layers and (ii) the second output image in which the filters are applied in one or multiple layers of the plurality of layers.

3. An image decoding apparatus for decoding an image, the image decoding apparatus comprising:
   the image filtering apparatus according to claim 1 as a filter to be applied to a decoded image.

4. An image encoding apparatus for encoding an image, the image encoding apparatus comprising:
   the image filtering apparatus according to claim 1 as a filter to be applied to the input image.

5. The image filtering apparatus according to claim 1, wherein:
   the second neural network filter is a subset of the first neural network filter, and
   the second neural network filter outputs one or multiple inter-mediate layers of the first neural network filter as the second output image.

* * * * *